(12) United States Patent
Yuan et al.

(10) Patent No.: US 11,909,526 B2
(45) Date of Patent: Feb. 20, 2024

(54) METHODS FOR COMMUNICATION, TERMINAL DEVICE, NETWORK DEVICE, AND COMPUTER READABLE MEDIUM

(71) Applicant: NEC CORPORATION, Tokyo (JP)

(72) Inventors: Fang Yuan, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 8 days.

(21) Appl. No.: 17/596,703

(22) PCT Filed: Jun. 17, 2019

(86) PCT No.: PCT/CN2019/091592
§ 371 (c)(1),
(2) Date: Dec. 16, 2021

(87) PCT Pub. No.: WO2020/252641
PCT Pub. Date: Dec. 24, 2020

(65) Prior Publication Data
US 2022/0345245 A1   Oct. 27, 2022

(51) Int. Cl.
*H04L 1/08* (2006.01)
*H04L 5/00* (2006.01)

(52) U.S. Cl.
CPC .............. *H04L 1/08* (2013.01); *H04L 5/0023* (2013.01); *H04L 5/0044* (2013.01)

(58) Field of Classification Search
CPC ....... H04L 1/08; H04L 5/0023; H04L 5/0044; H04L 5/0092; H04L 1/1812;
(Continued)

(56) References Cited

U.S. PATENT DOCUMENTS

2018/0007667 A1\* 1/2018 You ...................... H04L 5/0051
2018/0270880 A1\* 9/2018 Hosseini ............... H04L 1/0009
(Continued)

FOREIGN PATENT DOCUMENTS

CN   108886803 A  \* 11/2018   .......... H04L 1/1812
CN   108886803 A    11/2018
(Continued)

OTHER PUBLICATIONS

Huawei et al., "Reliability/robustness enhancement with multi-TRP/panel", R1-1906039, 3GPP TSG RAN WG1 meeting #97, May 17, 2019, 10pages. (Year: 2019).\*
(Continued)

*Primary Examiner* — Ayaz R Sheikh
*Assistant Examiner* — Louis Samara
(74) *Attorney, Agent, or Firm* — Sughrue Mion, PLLC

(57) ABSTRACT

Embodiments of the present disclosure provide a solution for multi-TRP transmissions. In a method for communication, a terminal device receives from a network device coupled with a plurality of TRPs, control information associated with a transmission of data from the network device to the terminal device. The terminal device determines, from the control information, a repetition scheme to be used by the network device to transmit the data to the terminal device via the plurality of TRPs. The terminal device receives the data from the network device based on the repetition scheme. With the embodiments of the present disclosure, only one DCI can schedule repeated data for multi-TRP transmission without increasing the DCI payload relative to a Rel.15 DCI. Also, the repetition scheme for transmitting data can be indicated by a same DCI more dynamically.

6 Claims, 14 Drawing Sheets

(58) Field of Classification Search
CPC ......... H04L 5/0051; H04L 1/00; H04B 7/024; H04B 1/7156; H04B 7/0695; H04W 72/0446
See application file for complete search history.

(56) References Cited

U.S. PATENT DOCUMENTS

| | | | |
|---|---|---|---|
| 2020/0077432 A1* | 3/2020 | Xiong | H04L 5/0092 |
| 2021/0136802 A1* | 5/2021 | Cirik | H04B 7/0695 |
| 2022/0085960 A1* | 3/2022 | Li | H04W 72/0446 |
| 2022/0200754 A1* | 6/2022 | Choi | H04L 1/00 |
| 2022/0217742 A1* | 7/2022 | Kim | H04L 5/0094 |

FOREIGN PATENT DOCUMENTS

| | | | | |
|---|---|---|---|---|
| CN | 109152069 A | * | 1/2019 | ............ H04B 7/024 |
| CN | 109152069 A | | 1/2019 | |
| CN | 109803297 A | * | 5/2019 | ............ H04B 7/0408 |
| CN | 113853763 A | * | 12/2021 | ............ H04L 5/0023 |
| CN | 110249599 B | * | 11/2022 | ............ H04L 27/26 |
| WO | 2018/064407 A1 | | 4/2018 | |
| WO | WO-2018064407 A1 | * | 4/2018 | ............ H03M 13/09 |
| WO | WO-2020197286 A1 | * | 10/2020 | ............ H04B 1/7156 |

OTHER PUBLICATIONS

Huawei et al., "Reliability/robustness enhancement with multi-TRP/panel", R1-1906039, 3GPP TSG RAN WG1 meeting #97, May 17, 2019, 10pages.

Interdigital Inc., "NR-PDCCH Design for Multi-TRP Transmission", R1-1716465, 3GPP TSG RAN WG1 Meeting NR#3, Sep. 21, 2017, 3pages.

International Search Report for PCT/CN2019/091592 dated Mar. 20, 2020 [PCT/ISA/210].

Written Opinion for PCT/CN2019/091592 dated Mar. 20, 2020 [PCT/ISA/237].

Office Action dated May 2, 2023 in Japanese Application No. 2021-575211.

ZTE, "Enhancements on Multi-TRP and Multi-panel Transmission", 3GPP TSG RAN WG1 #97, R1-1906236, May 13-17, 2019, Reno USA, pp. 1-14 (14 pages total).

Ericsson, "On multi-TRP and multi-panel", 3GPP TSG RAN WG1 Meeting #96, R1-1902540, Feb. 25-Mar. 1, 2019, Athens, Greece, pp. 1-11 (11 pages total).

* cited by examiner

METHODS FOR COMMUNICATION, TERMINAL DEVICE, NETWORK DEVICE, AND COMPUTER READABLE MEDIUM

CROSS REFERENCE TO RELATED APPLICATIONS

This application is a National Stage of International Application No. PCT/CN2019/091592 filed Jun. 17, 2019.

FIELD

Embodiments of the present disclosure generally relate to the field of communication, and more particularly, to multi-Transmission and Reception Point (TRP) communications.

BACKGROUND

The latest developments of the 3GPP standards are referred to as Long Term Evolution (LTE) of Evolved Packet Core (EPC) network and Evolved UMTS Terrestrial Radio Access Network (E-UTRAN), also commonly termed as '4G.' In addition, the term '5G New Radio (NR)' refers to an evolving communication technology that is expected to support a variety of applications and services. The 5G NR is part of a continuous mobile broadband evolution promulgated by the Third Generation Partnership Project (3GPP) to meet new requirements associated with latency, reliability, security, scalability (for example, with Internet of Things), and other requirements. Some aspects of the 5G NR may be based on the 4G Long Term Evolution (LTE) standards.

In 3GPP RAN1-96b/97, the following has been agreed. For multi-TRP based Ultra-Reliable Low Latency Communication (URLLC), scheduled by single Downlink Control Information (DCI), it is agreed to support a number of repetition schemes, for example, scheme 1 (a Space Division Multiplexing, SDM, scheme), scheme 2 (a Frequency Division Multiplexing, FDM, scheme), scheme 3 (a Time Division Multiplexing, TDM, scheme), and scheme 4 (another TDM scheme). However, it is still unclear how to indicate a switch between different repetition modes for multi-TRP based URLLC transmission, among all the supported repetition schemes.

SUMMARY

In general, example embodiments of the present disclosure provide a solution for multi-TRP communications.

In a first aspect, there is provided a method for communication. The method comprises receiving, at a terminal device and from a network device coupled with a plurality of TRPs, control information associated with a transmission of data from the network device to the terminal device. The method also comprises determining, from the control information, a repetition scheme to be used by the network device to transmit the data to the terminal device via the plurality of TRPs. The method further comprises receiving the data from the network device based on the repetition scheme.

In a second aspect, there is provided a method for communication. The method comprises determining, at a network device coupled with a plurality of TRPs, a repetition scheme to be used by the network device to transmit data to a terminal device via the plurality of TRPs. The method also comprises generating, control information associated with a transmission of the data from the network device to the terminal device, the control information indicating the repetition scheme. The method also comprises transmitting the control information to the terminal device. The method further comprises transmitting the data to the terminal device via the plurality of TRPs based on the repetition scheme.

In a third aspect, there is provided a method for communication. The method comprises receiving, at a terminal device and from a network device, first control information associated with first data to be transmitted from the network device to the terminal device. The method also comprises receiving, from the network device, second control information associated with second data to be transmitted from the network device to the terminal device, the first control information and the second control information being transmitted by the network device via a first TRP and a second TRP, respectively, a first starting time point of the first control information and a second starting time point of the second control information being within one time interval for the terminal device to monitor control information from the network device. The method also comprises selecting target control information from the first control information and the second control information, based on a transmission criterion of the target control information use by the network device. The method further comprises transmitting, to the network device, a first feedback for the first data and a second feedback for the second data on a feedback channel indicated in the target control information.

In a fourth aspect, there is provided a method for communication. The method comprises generating, at a network device, first control information associated with first data to be transmitted from the network device to a terminal device and second control information associated with second data to be transmitted from the network device to the terminal device, the first control information and the second control information being to be transmitted by the network device via a first TRP and a second TRP, respectively, a first starting time point of the first control information and a second starting time point of the second control information being within one time interval for the terminal device to monitor control information from the network device. The method also comprises transmitting, via one of the first TRP and the second TRP, target control information among the first control information and the second control information to the terminal device based on a transmission criterion, the target control information indicating a feedback channel for the terminal device to transmit a first feedback for the first data and a second feedback for the second data. The method further comprises transmitting, via the other one of the first TRP and the second TRP, the other control information of the first control information and the second control information to the terminal device.

In a fifth aspect, there is provided a method for communication. The method comprises receiving, at a terminal device and from a network device, first control information associated with first data to be transmitted from the network device to the terminal device, the first control information having a first index. The method also comprises receiving, from the network device, second control information associated with second data to be transmitted from the network device to the terminal device, the second control information having a second index, the first control information and the second control information being transmitted by the network device via a first TRP and a second TRP, respectively, a first starting time point of the first control information and a second starting time point of the second control information being within one time interval for the terminal device to monitor control information from the network device. The method further comprises determining a receiving order of the first control information and the second control information based on the first index and the second index.

In a sixth aspect, there is provided a method for communication. The method comprises generating, at a network device coupled with a plurality of TRPs, control information associated with a transmission from the network device to a terminal device. The method also comprises determining a first index for the control information based on a second index of a TRP among the plurality of TRPs, the control information being to be transmitted via the TRP. The method further comprises transmitting, to the terminal device, the control information including the first index.

In a seventh aspect, there is provided a method for communication. The method comprises receiving, at a terminal device and from a network device coupled with a plurality of TRPs, control information associated with a transmission from the network device to the terminal device. The method also comprises determining, from the control information, a first index for the control information. The method also comprises determining a second index of a TRP among the plurality of TRPs, the control information being transmitted by the network device via the TRP. The method further comprises determining a reception state of previous control information of the control information, based on the first index and the second index.

In an eighth aspect, there is provided a terminal device. The terminal device comprises a processor and a memory storing instructions. The memory and the instructions are configured, with the processor, to cause the terminal device to perform the method according to one of the first, the third, the fifth, and the seventh aspects.

In a ninth aspect, there is provided a network device. The network device comprises a processor and a memory storing instructions. The memory and the instructions are configured, with the processor, to cause the network device to perform the method according to one of the second, the fourth, and the sixth aspects.

In a tenth aspect, there is provided a computer readable medium having instructions stored thereon. The instructions, when executed on at least one processor of a device, cause the device to perform the method according to one of the first aspect through the seventh aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar elements.

DETAILED DESCRIPTION OF EMBODIMENTS

Figure 1:
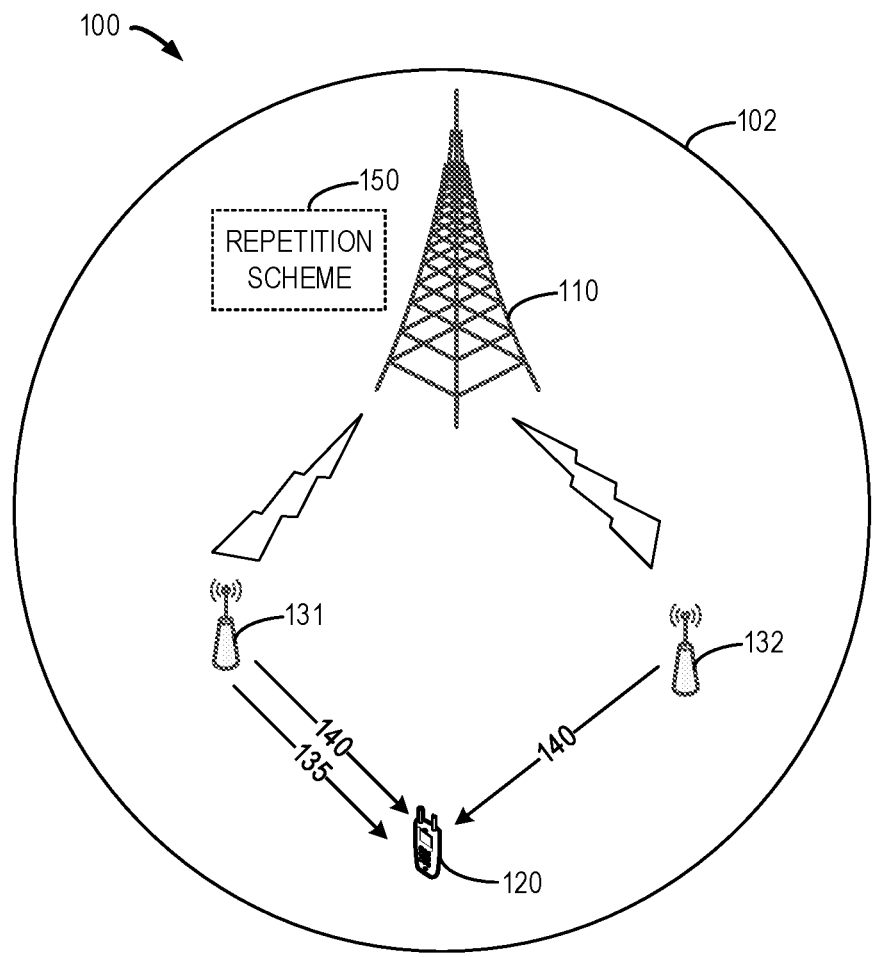
FIG. 1 is a schematic diagram of a communication environment in which some embodiments of the present disclosure can be implemented.

Principles of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "transmission reception point," "transmission/reception point," or "transmission and reception point" may generally indicate a station communicating with the user equipment. However, the transmission and reception point may be referred to as different terms such as a base station (BS), a cell, a Node-B, an evolved Node-B (eNB), a next generation NodeB (gNB), a Transmission Reception Point (TRP), a sector, a site, a base transceiver system (BTS), an access point (AP), a relay node (RN), a remote radio head (RRH), a radio unit (RU), an antenna, and the like.

That is, in the context of the present disclosure, the transmission and reception point, the base station (BS), or the cell may be construed as an inclusive concept indicating a portion of an area or a function covered by a base station controller (BSC) in code division multiple access (CDMA), a Node-B in WCDMA, an eNB or a sector (a site) in LTE, a gNB or a TRP in NR, and the like. Accordingly, a concept of the transmission and reception point, the base station (BS), and/or the cell may include a variety of coverage areas such as a mega-cell, a macro-cell, a micro-cell, a pico-cell, a femto-cell, and the like. Furthermore, such concept may include a communication range of the relay node (RN), the remote radio head (RRH), or the radio unit (RU).

In the context of the present disclosure, the user equipment and the transmission/reception point may be two transmission/reception subjects, having an inclusive meaning, which are used to embody the technology and the technical concept disclosed herein, and may not be limited to a specific term or word. Furthermore, the user equipment and the transmission/reception point may be uplink or downlink transmission/reception subjects, having an inclusive meaning, which are used to embody the technology and the technical concept disclosed in connection with the present embodiment, and may not be limited to a specific term or word. Herein, an uplink (UL) transmission/reception is a scheme in which data is transmitted from user equipment to a base station. Alternatively, a downlink (DL) transmission/reception is a scheme in which data is transmitted from the base station to the user equipment.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

FIG. 1 is a schematic diagram of a communication environment 100 in which some embodiments of the present disclosure can be implemented. The communication environment 100 includes a network device 110 and a terminal device 120 served by the network device 110. The serving area of the network device 110 may be called as a cell 102. In the communication environment 100, the network device 110 can transmit data and control information to the terminal device 120, and the terminal device 120 can also transmit data and control information to the network device 110. A communication link from the network device 110 to the terminal device 120 is referred to as a downlink (DL) or a forward link, whereas a communication link from the terminal device 120 to the network device 110 is referred to as an uplink (UL) or a reverse link.

As shown in FIG. 1, the network device 110 is coupled with two TRPs 131 and 132, and may communicate with the terminal device 120 via the two TRPs 131 and 132. For example, in a repeated transmission from the network 110 to the terminal device 120, such as in a multi-TRP URLLC transmission, the network device 110 may transmit same data 140 via the TRP 131 and the TRP 132. As used herein, the data 140 may include any data that can be transmitted between the network device 110 and the terminal device 120, including user plane data, control plane data, or the like. For example, the data 140 may be a Transport Block (TB) or a packet. In the following, the TRP 131 may also be referred to as a first TRP, while the TRP 132 may also be referred to as a second TRP. The first and second TRPs 131 and 132 may be included in a same serving cell (such as, the cell 102 as shown in FIG. 1) or different serving cells provided by the network device 110.

In some embodiments, the first and second TRPs 131 and 132 may be explicitly associated with different higher-layer configured identities. For example, a higher-layer configured index can be associated with a pre-defined Control Resource Set (CORESET), a pre-defined reference signal (RS), or a pre-defined Transmission Configuration Indication (TCI) state, which is used to differentiate between transmissions from different TRPs to the terminal device 120. When the terminal device 120 receives two DCIs from two CORESETs which are associated with different higher-layer configured identities, the two DCIs are indicated from different TRPs. Further, the first and second TRPs 131 and 132 may be implicitly identified by a dedicated configuration to the physical channels or signals. For example, a dedicated CORESET, a RS, and a TCI state, which are associated with a TRP, are used to identify a transmission from a different TRP to the terminal device 120. For example, when the terminal device 120 receives a DCI from a dedicated CORESET, the DCI is indicated from the associated TRP dedicated by the CORESET.

In the repeated transmission via the two TRPs 131 and 132, the network device 110 may use a repetition scheme 150 among a number of available repetition schemes. The repetition scheme 150 may specify a transmission manner for the network device 110 to use the two TRPs 131 and 132 cooperatively, for example, a multiplexing scheme between the two TRPs 131 and 132, the respective resource allocations for the two TRPs 131 and 132, or the like.

In addition, before transmitting the data 140 to the terminal device 120, the network device 110 may transmit control information 135 associated with the transmission of the data 140. For example, the control information 135 can indicate various transmission parameters related to the transmission of data 140, such as a Frequency Domain Resource Assignment (FDRA), a Time Domain Resource Assignment (TDRA) which may include a slot offset and a start/length indicator value, a Demodulation Reference Signal (DMRS) group, a Redundancy Version (RV), as defined in the 3GPP specifications. It is to be understood that the transmission parameters indicated in the control information 135 are not limited to the ones as listed above. The embodiments of the present disclosure may equally applicable to control information including any transmission parameters.

In some embodiments, the control information 135 may be a DCI as defined in the 3GPP specifications, which can indicate various transmission parameters dynamically, namely, on a relatively short time scale. In some other embodiments, the control information 135 may be a Radio Resource Control (RRC) message or a Medium Access Control (MAC) Control Element (CE) message, which can indicate various transmission parameters semi-statically, that is, on a relatively long time scale.

Although some embodiments of the present disclosure are described with reference to the first and second TRPs 131 and 132 within a same serving cell provided by the network device 110, these embodiments are only for the purpose of illustration and help those skilled in the art to understand and implement the present disclosure, without suggesting any limitations on the scope of the present disclosure. It is to be understood that embodiments of the present disclosure described herein can be implemented in various manners other than the ones described below.

It is to be understood that the number of network devices, the number of terminal devices, and the number of TRPs as shown in FIG. 1 are only for the purpose of illustration without suggesting any limitations. Actually, the communication environment 100 may include any suitable number of network devices, any suitable number of terminal devices, and any suitable number of TRPs adapted for implementing embodiments of the present disclosure. In other words, embodiments of the present disclosure may also be applicable to a scenario where a terminal device communicates with more than one network device, or a network device coupled with more than two TRPs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission/Reception Point (TRP), a Remote Radio Unit (RRU), a radio head (RH), a remote radio head (RRH), a low power node such as a femto node, a pico node, and the like.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UEs as examples of terminal devices and the terms "terminal device" and "user equipment" (UE) may be used interchangeably in the context of the present disclosure.

As used herein, the term "resource" or "transmission resource" may refer to any resource for performing a communication, for example, a communication between a network device and a terminal device, such as a resource in time domain, a resource in frequency domain, a resource in space domain, a resource in code domain, or any other resource enabling a communication, and the like. Accordingly, the term "resource pool" may refer to a set of resource units in time domain (for example, time slots), in frequency domain (for example, sub-channels), in space domain, in code domain, and the like. In the following, a resource in both frequency domain and time domain will be used as an example of a transmission resource for describing some embodiments of the present disclosure. It is noted that embodiments of the present disclosure are equally applicable to other resources in other domains.

The communications in the communication environment 100 may conform to any suitable standards including, but not limited to, Global System for Mobile Communications (GSM), Extended Coverage Global System for Mobile Internet of Things (EC-GSM-IoT), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

In current specifications, a TB repeating mode is semi-statically configured by RRC signaling. However, it is still unclear how to indicate a switch between different repetition modes for multi-TRP based URLLC transmission, among all the supported repetition schemes. In view of the above problems and other potential problems in the traditional solutions, embodiments of the present disclosure provide a solution for multi-TRP communication, and particularly for a URLLC communication. In some embodiments, a repetition scheme (also termed as a repetition mode) for a transmission (for example, a URLLC transmission) of data (for example, a TB) can be dynamically indicated, such as through a DCI. With the embodiments of the present disclosure, only one DCI can schedule repeated data for multi-TRP transmission without increasing the DCI payload relative to a Rel.15 DCI. Also, the repetition scheme for transmitting data can be indicated by a same DCI more dynamically. Principles and implementations of embodiments of the present disclosure will be described in detail below.

Figure 2:
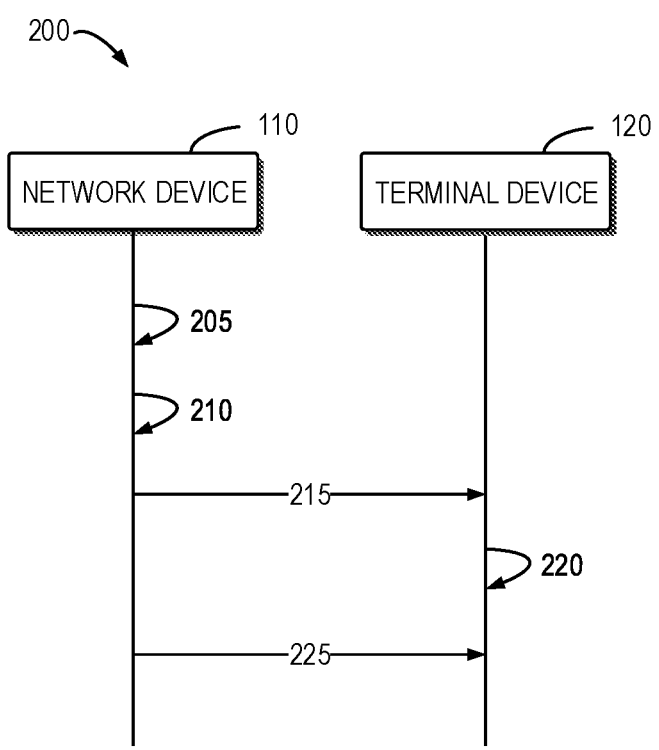
FIG. 2 shows an example communication process between a network device and a terminal device in accordance with some embodiments of the present disclosure.

FIG. 2 shows an example communication process 200 between the network device 110 and the terminal device 120 in accordance with some embodiments of the present disclosure. In the following, embodiments of the present disclosure will be described with reference to the communication environment 100 as shown in FIG. 1, in which the network device 110 is coupled with two TRPs 131 and 132. However, it should be appreciated that embodiments of the present disclosure are equally applicable to the cases where the network device 110 is coupled with three or more TRPs and transmits the data 140 via the three or more TRPs.

As shown in FIG. 2, the network device 110 determines 205 a repetition scheme 150 to be used by the network device 110 to transmit the data 140 to the terminal device 120 via the first TRP 131 and the second TRP 132. There are various available repetition schemes for the network device 110 to perform the transmission of the data 140 via the two TRPs 131 and 132. Accordingly, in determining the repetition scheme 150, the network device 110 can select one repetition scheme among these available repetition schemes. Some of the available repetition schemes will be introduced below with reference to FIGS. 3A-3E. However, it is to be understood that the embodiments of the present disclosure are not limited to the repetition schemes as described herein, but are equally applicable to any existing or future repetition schemes.

FIGS. 3A-3E show example diagrams of transmission resources for various repetition schemes, in accordance with some embodiments of the present disclosure. In FIGS. 3A-3E, the horizontal axis represents the time domain, and the vertical axis represents the frequency domain. As examples of available repletion schemes of multi-TRP transmissions, some repetition schemes for multi-TRP based URLLC are clarified to facilitate further down-selection for one or more repetition schemes in RAN1 #96bis, which can be scheduled by a single DCI. These repetition schemes are illustratively shown in FIGS. 3A-3E.

Figure 3A:
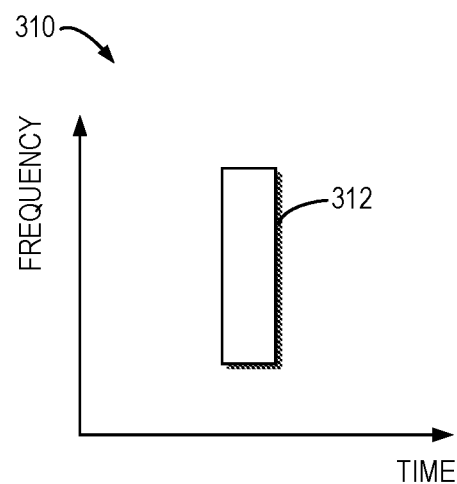
FIGS. 3A-3E show example diagrams of transmission resources for various repetition schemes, in accordance with some embodiments of the present disclosure.

A space division multiplexing (SDM) scheme 310 is illustrated in FIG. 3A, which may also be termed as an SDM1a scheme. In the SDM scheme 310, the network device 110 may use a same set of frequency and time resources 312 for the first TRP 131 and the second TRP 132 to transmit the data 140 to the terminal device 110. For example, in the SDM scheme 310, TCI states are within a single slot, with overlapped time and frequency resource allocation. Each transmission occasion is a layer or a set of layers of a same TB, with each layer or layer set is associated with one TCI and one set of DMRS port(s). A single codeword with one RV is used across all spatial layers or layer sets. From a perspective of the terminal device 120, different coded bits are mapped to different layers or layer sets with the same mapping rule as in Rel-15.

Figure 3B:
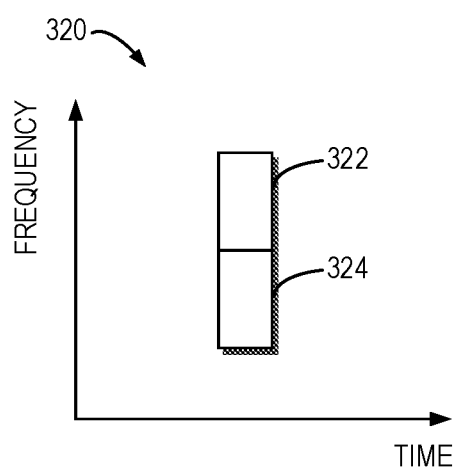
Figure 3C:
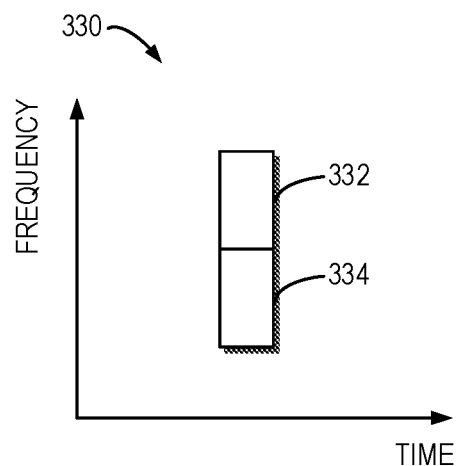

Two frequency division multiplexing (FDM) schemes 320 and 330 are illustrated in FIGS. 3B and 3C, which may also be termed as a first FDM (FDM1) scheme and a second FDM (FDM2) scheme, respectively. In some embodiments, in the first FDM scheme 320 and the second FDM scheme 330, TCI states are within a single slot, with non-overlapped frequency resource allocation. Each non-overlapped frequency resource allocation is associated with one TCI state. Same single/multiple DMRS port(s) are associated with all non-overlapped frequency resource allocations.

In the first FDM scheme 320, the network device 110 may use two sets of frequency resources 322 and 324 for the first TRP 131 and the second TRP 132, respectively, to transmit the data 140 to the terminal device 110. However, as shown in FIG. 3B, the two sets of frequency resources 322 and 324 adjoin with each other in frequency domain. This means that the two sets of frequency resources 322 and 324 can be indicated by one FDRA, and the network device 110 can divide the indicated frequency resources into the two sets 322 and 324 based on a pre-defined splitting rule, for example, equally splitting the indicated frequency resources.

In addition, with the first FDM scheme 320, a same codeword of the data 140 is transmitted by the network device 110 via the first TRP 131 and the second TRP 132. For example, in the first FDM scheme 320, a single codeword with one RV is used across the full resource allocation. From a perspective of the terminal device 120, a common Resource Block (RB) mapping (a mapping from a codeword to a layer as in Rel-15) is applied across the full resource allocation.

Similarly, in the second FDM scheme 330, the network device 110 also can use two sets of frequency resources 332 and 334 for the first TRP 131 and the second TRP 132, respectively, to transmit the data 140 to the terminal device 110. Again, as shown in FIG. 3C, the two sets of frequency resources 332 and 334 adjoin with each other in frequency domain. This means that the two sets of frequency resources 332 and 334 can be indicated by one FDRA, and the network device 110 can divide the indicated frequency resources into the two sets 332 and 334 based on a pre-defined splitting rule, for example, equally splitting the indicated frequency resources.

Different from the case of the first FDM scheme 320, with the second FDM scheme 330, two different codewords of the data 140 are transmitted by the network device 110 via the first TRP 131 and the second TRP 132, respectively. For example, in the second FDM scheme 330, a single codeword with one RV is used for each non-overlapped frequency resource allocation. The RVs corresponding to each non-overlapped frequency resource allocation can be the same or different.

Figure 3D:
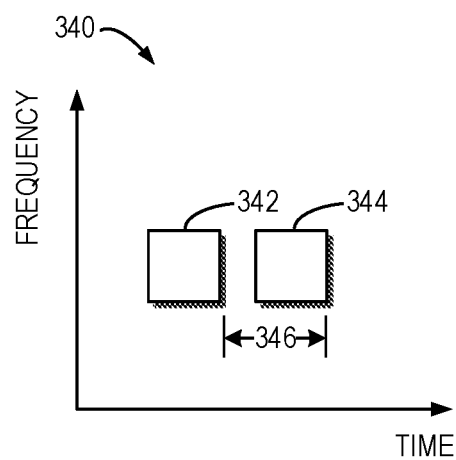
Figure 3E:
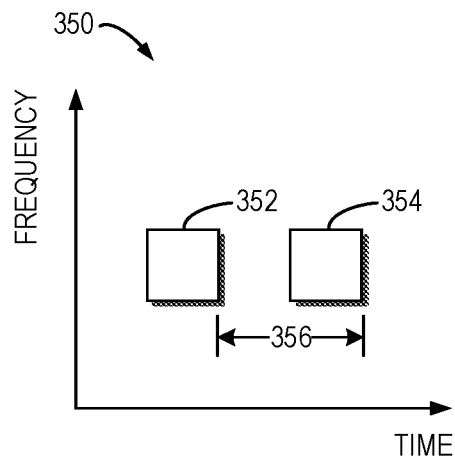

Two time division multiplexing (TDM) schemes 340 and 350 are illustrated in FIGS. 3D and 3E, which may also be termed as a first TDM (TDM1) scheme and a second TDM (TDM2) scheme, respectively. In the first TDM scheme 340, the network device 110 may use two sets of time resources 342 and 344 for the first TRP 131 and the second TRP 132, respectively, to transmit the data 140 to the terminal device 110. An offset 346 between the two sets 342 and 344 is less than a time slot as defined in the 3GPP specifications. In other words, the sets of time resources 342 and 344 are located in the same time slot. For example, in the first TDM scheme 340, TCI states are within a single slot, with non-overlapped time resource allocation. Each transmission occasion of a TB has one TCI and one RV with the time granularity of mini-slot. All transmission occasion(s) within the slot use a common Modulation and Coding Scheme (MCS) with same single or multiple DMRS port(s). A RV/TCI state can be same or different among transmission occasions.

Similarly, in the second TDM scheme 350, the network device 110 also can use two sets of time resources 352 and 354 for the first TRP 131 and the second TRP 132, respectively, to transmit the data 140 to the terminal device 110. Different from the case of the first TDM scheme 340, with the second TDM scheme 350, an offset 356 between the two sets 352 and 354 is greater than a time slot as defined in the 3GPP specifications. In other words, the sets of time resources 352 and 354 are located in different time slots. For example, in the second TDM scheme 350, TCI states are with K (n<=K) different slots. Each transmission occasion of a TB has one TCI and one RV. All transmission occasion (s) across K slots use a common MCS with same single or multiple DMRS port(s). A RV/TCI state can be same or different among transmission occasions.

After determining the repetition scheme 150 and before transmitting the data 140 via the two TRPs 131 and 132 based on the repetition scheme 150, the network device 110 may inform the terminal device 120 of the repetition scheme 150 by transmitting the control information 135 to the terminal device 120. In other words, the network device 110 can indicate the repetition scheme 150 in the control information 135. Accordingly, upon receiving the control information 135, the terminal device 120 may know the repetition scheme 150 to be used by the network device 110 and thus can receive the data 140 properly.

Thus, referring back to FIG. 2, the network device 110 generates 210 the control information 135 associated with the transmission of the data 140 from the network device 110 to the terminal device 120. The network device 110 indicates the repetition scheme 150 in the control information 135, so that the terminal device 120 at the receiving side can identify the repetition scheme 150 to be employed to transmit the data 140. In some embodiments, the control information 135 may be downlink control information (DCI) as defined in the 3GPP specifications. In some other embodiments, the control information 135 may be a RRC message or a MAC CE message.

The network device 110 can use one of various manners to indicate the repetition scheme 150 in the control information 135. For example, a straightforward manner may be using a unique explicit indication for each of all the available repetition schemes. However, this explicit indication manner may need to introduce new an indication field in the control information 135, and thus increase the signaling overhead. Hence, it would be advantageous if the repetition scheme 150 can be indicated through different combinations of the numbers of some existing fields in the control information 135, such as a DCI. To this end, necessary numbers of some transmission parameters to be indicated for the above-discussed repetition schemes are listed and analyzed in Table 1 as below.

TABLE 1

Numbers of transmission parameters for different repetition schemes

| Transmission Parameter | SDM | First FDM | Second FDM | First TDM | Second TDM |
|---|---|---|---|---|---|
| FDRA | 1 | 1 (divided into 2 based on fixed or configured splitting) | 1 (divided into 2 basedon fixed or configured splitting) | 1 | 1 |
| TDRA | 1 | 1 | 1 | 2 (higher layer configured two values) | 2 (higher layer configured two values) |
| DMRS group | 2 | 1 | 1 | 1 | 1 |
| RV | 1 | 1 | 2 (higher layer configured two values) | 2 (higher layer configured two values) | 2 (higher layer configured two values) |

It can be seen from Table 1 that for the SDM scheme 310, there may be a common FDRA and a common TDRA for the first TRP 131 and the second TRP 132, since the first TRP 131 and the second TRP 132 share a same set of frequency domain resources and a same set of time domain resources in the SDM scheme 310. There may be two DMRS groups for the first TRP 131 and the second TRP 132, respectively, since the first TRP 131 and the second TRP 132 are to transmit the data 140 in a SDM manner. There may be a common RV for the first TRP 131 and the second TRP 132, since the first TRP 131 and the second TRP 132 transmit a same codeword of the data 140 in the SDM scheme 310.

For the first FDM scheme 320, there may be a common FDRA for the first TRP 131 and the second TRP 132, and the set of frequency domain resources indicated by the common FDRA are divided between the first TRP 131 and the second TRP 132 based on a pre-defined splitting rule, for example, equally splitting the set of frequency domain resources into two parts. There may be a common TDRA for the first TRP 131 and the second TRP 132, since the first TRP 131 and the second TRP 132 share a same set of time domain resources in the first FDM scheme 320. There may be a common DMRS group for the first TRP 131 and the second TRP 132, since the first TRP 131 and the second TRP 132 can use one DMRS group in the first FDM scheme 320. There may be a common RV for the first TRP 131 and the second TRP 132, since the first TRP 131 and the second TRP 132 transmit a same codeword of the data 140 in the first FDM scheme 320.

For the second FDM scheme 330, the number of the FDRAs, the number of the TDRAs, and the number of the DMRS groups may be the same as the first FDM scheme 320. The difference between the second FDM scheme 330 and the first FDM scheme 320 is that there may be two respective RVs for the first TRP 131 and the second TRP 132, since the first TRP 131 and the second TRP 132 transmit respective different codewords of the data 140 in the second FDM scheme 330.

For the first TDM scheme 340, there may be a common FDRA for the first TRP 131 and the second TRP 132, since the first TRP 131 and the second TRP 132 share a same set of frequency domain resources in the first TDM scheme 340. There may be two respective TDRAs for the first TRP 131 and the second TRP 132, since the first TRP 131 and the second TRP 132 use different sets of time domain resources in the first TDM scheme 340. There may be a common DMRS group for the first TRP 131 and the second TRP 132, since the first TRP 131 and the second TRP 132 can use one DMRS group in the first TDM scheme 340. There may be two respective RVs for the first TRP 131 and the second TRP 132, since the first TRP 131 and the second TRP 132 transmit the data 140 in different time domain resources in the first TDM scheme 340.

For the second TDM scheme 350, the number of the FDRAs, the number of the TDRAs, the number of the DMRS groups, and the number of the RVs may be the same as the first TDM scheme 340. The difference between the first TDM scheme 340 and the second TDM scheme 350 is that a first set of time domain resources 342 for the first TRP 131 and a second set of time domain resources 344 for the second TRP 132 are within one time slot in the first TDM scheme 340, whereas the first set of time domain resources 352 and the second set of time domain resources 354 are located in different time slots in the second TDM scheme 350.

Therefore, Table 1 shows a possibility that the network device 110 can indicate a particular repetition scheme among different repetition schemes, such as one of the SDM scheme 310, the first FDM scheme 320, the second FDM scheme 330, the first TDM scheme 340, and the second TDM scheme 350, by indicating particular numbers of the above transmission parameters. For example, two DMRS groups can indicate the SDM scheme 310. One RV and one DMRS group can indicate the first FDM scheme 320. Two RVs, one DMRS group, and one TDRA can indicate the second FDM scheme 330. Two RVs, one DMRS group, and two TDRAs can indicate the first TDM scheme 340 and the second TDM scheme 350. The two TDM schemes can be distinguished by an offset between the two sets of frequency domain resources indicated by the two TDRAs.

Thus, in generating the control information 135, if the network device 110 determines the repetition scheme 150 as the SDM scheme 310, the network device 110 may indicate two DMRS groups in the control information 135 for the first TRP 131 and the second TRP 132, respectively.

Alternatively, if the network device 110 determines the repetition scheme 150 as the first FDM scheme 320, the network device 110 may indicate one DMRS group and one RV in the control information 135, for both the first TRP 131 and the second TRP 132. If the network device 110 determines the repetition scheme 150 as the second FDM scheme 330, the network device 110 may indicate one DMRS group and one TDRA in the control information 135 for both the first TRP 131 and the second TRP 132, and can indicate two RVs in the control information 135 for the first TRP 131 and the second TRP 132, respectively.

Alternatively, if the network device 110 determines the repetition scheme 150 as a TDM scheme, for example, the first TDM scheme 340 or the second TDM scheme 350, the network device 110 may indicate one DMRS group in the control information 135 for both the first TRP 131 and the second TRP 132, and may indicate two RVs and two TDRAs for the first TRP 131 and the second TRP 132, respectively.

Further, if the TDM scheme determined by the network device 110 is the first TDM scheme 340, the network device 110 can configure the two TDRAs to indicate two sets of time domain resources located in one time slot. For example, each of the two TDRAs may have an offset indicator (such as, $K_0$) to indicate an offset between a current time slot and the time slot where the allocated set of time resources is located. Using this offset indicator, for the first TDM scheme 340, the network device 110 can configure a same value for the two offset indicators of the two TDRAs.

On the other hand, if the TDM scheme determined by the network device 110 is the second TDM scheme 350, the network device 110 can alternatively configure the two TDRAs to indicate two sets of time domain resources located in respective two different time slots. In the case that the offset indicator is included in a TDRA, the network device 110 can configure two different values for the two offset indicators of the two TDRAs.

According to the above Table 1, the TDRA field in the control information 135 may need to indicate one TDRA for the SDM scheme 310, the first FDM scheme 320, and the second FDM scheme 330, and may alternatively need to indicate two TDRAs for the first TDM scheme 340 and the second TDM scheme 350. Similarly, the RV field in the control information 135 may need to indicate one RV for the SDM scheme 310 and the first FDM scheme 320, and may instead need to indicate two RVs for the second FDM scheme 330, the first TDM scheme 340 and the second TDM scheme 350.

Hence, in generating the control information 135, the network device 110 may include a versatile TDRA field (also referred to as a bitmap) in the control information 135, for indicating both some single TDRA values and some pairs of TDRA values. In other words, a first value of TDRA bits (also referred to as a code point) in the TDRA field may indicate one TDRA value common to the first TRP 131 and the second TRP 132, and a second value of the TDRA bits in the TDRA bitmap can indicate two TDRA values for the first TRP 131 and the second TRP 132, respectively. In this way, the number of TDRA bits can remain unchanged for different repetition schemes. The following Table 2 shows an example of such a versatile TDRA bitmap.

TABLE 2

An example versatile TDRA field

| Code point of the TDRA field | TDRA value(s) |
|---|---|
| 00 | {$K_0$1/SLIV1} |
| 01 | { $K_0$2/SLIV2, $K_0$3/SLIV3} |
| 10 | { $K_0$4/SLIV4} |
| 11 | { $K_0$5/SLIV5, $K_0$6/SLIV6} |

As illustrated in Table 2, in case the control information 135 includes a TDRA bitmap of 2 bits, then the value "00" of the TDRA bits can indicate a first value (denoted as $K_0$1) of the offset indicator $K_0$ and a first value (denoted as SLIV1) of the Start and Length Indicator Value (SLIV), common to the first TRP 131 and the second TRP 132. In addition, the value "01" of the TDRA bits can indicate a second value (denoted as $K_0$2) of the offset indicator $K_0$ and a second value (denoted as SLIV2) of the SLIV, for one of the first TRP 131 and the second TRP 132, and a third value (denoted as $K_0$3) of the offset indicator $K_0$ and a third value (denoted as SLIV3) of the SLIV, for the other one of the first TRP 131 and the second TRP 132.

Moreover, the value "10" of the TDRA bits can indicate a fourth value (denoted as $K_0$4) of the offset indicator $K_0$ and a forth value (denoted as SLIV4) of the SLIV, common to the first TRP 131 and the second TRP 132. Furthermore, the value "11" of the TDRA bits can indicate a fifth value (denoted as $K_0$5) of the offset indicator $K_0$ and a fifth value (denoted as SLIV5) of the SLIV, for one of the first TRP 131 and the second TRP 132, and a sixth value (denoted as $K_0$6) of the offset indicator $K_0$ and a sixth value (denoted as SLIV6) of the SLIV, for the other one of the first TRP 131 and the second TRP 132.

It is to be understood that the specific TDRA bitmap as shown in Table 2 with a specific number of bits and the specific mapping from a specific value of the bits to specific values of $K_0$ and SLIV are only illustrative examples, without suggesting any limitations as to the scope of the disclosure. In other embodiments, the versatile TDRA bitmap as described herein may have any number of bits and have any possible mappings from values of the bits to values of the TDRA. In some embodiments, a mapping of the TDRA bitmap can be indicated by a higher layer than a physical (PHY) layer, and thus the specific mapping can be flexibly changed if desired, without increasing the number of TDRA bits. In some embodiments, there may be multiple TDRA tables configured similar to Table 2. For example, the RRC signaling may configure multiple TRRA tables, and a MAC-CE may be used to activate one TRRA table for DCI indications.

Likewise, in generating the control information 135, the network device 110 may include a versatile RV bitmap in the control information 135, for indicating both some single RV values and some pairs of RV values. In other words, a first value of RV bits in the RV bitmap may indicate one RV value common to the first TRP 131 and the second TRP 132, and a second value of the RV bits in the RV bitmap can indicate two RV values for the first TRP 131 and the second TRP 132, respectively. In this way, the number of RV bits can remain unchanged for different repetition schemes. The following Table 3 shows an example of such a versatile RV bitmap.

TABLE 3

An example versatile RV field

| Code point of the RV field | RV value(s) |
|---|---|
| 00 | {RV1} |
| 01 | {RV2} |
| 10 | {RV3, RV4} |
| 11 | {RV5, RV6} |

As illustrated in Table 3, in case the control information 135 includes a RV bitmap of 2 bits, then the value "00" of the RV bits can indicate a first value (denoted as RV1) of the RV, common to the first TRP 131 and the second TRP 132. In addition, the value "01" of the RV bits can indicate a second value (denoted as RV2) of the RV common to the first TRP 131 and the second TRP 132. Moreover, the value "10" of the RV bits can indicate a third value (denoted as RV3) of the RV, for one of the first TRP 131 and the second TRP 132, and a fourth value (denoted as RV4) of the RV, for the other one of the first TRP 131 and the second TRP 132. Furthermore, the value "11" of the RV bits can indicate a fifth value (denoted as RV5) of the RV, for one of the first TRP 131 and the second TRP 132, and a sixth value (denoted as RV6) of the RV, for the other one of the first TRP 131 and the second TRP 132.

It is to be understood that the specific RV bitmap with a specific number of bits and the specific mapping from a specific value of the bits to specific values of RV are only illustrative examples, without suggesting any limitations as to the scope of the disclosure. In other embodiments, the versatile RV bitmap as described herein may have any number of bits and have any possible mappings from values of the bits to values of the RV. In some embodiments, a mapping of the RV bitmap can be indicated by a higher layer than the PHY layer, and thus the specific mapping can be flexibly changed if desired, without increasing the number of RV bits. In some embodiments, there may be multiple RV tables configured. For example, the RRC signaling may configure multiple RV tables similar to Table 3, and a MAC-CE may be used to activate one RV table for DCI indications.

It can be further seen from Table 1 that if the network device 110 indicates two DRMS groups in the control information 135, then only one TDRA and only one RV need to be indicated in the control information 135. This relation between the number of the DMRS groups and the number of the TDRAs as well as the number of the RVs can be used to simplify the design of the TDRA bitmap and the RV bitmap, so as to reduce the signaling overhead related to indicating the TDRA(s) and RV(s).

In particular, if the network device 110 indicates two DMRS groups in the control information 135, then the network device 110 can use each value of the TDRA bits in the TDRA bitmap to indicate only one TDRA value. The following Table 4 shows an example of such a TDRA bitmap when two DMRS groups are indicated in the control information 135.

TABLE 4

An example TDRA field when two DMRS groups

| Code point of the TDRA field | TDRA value if 2 DMRS groups |
|---|---|
| 00 | {$K_0 1$/SLIV1} |
| 01 | {$K_0 2$/SLIV2} |
| 10 | {$K_0 3$/SLIV3} |
| 11 | {$K_0 4$/SLIV4} |

As illustrated in Table 4, in case the control information 135 indicates two DMRS groups and includes a TDRA bitmap of 2 bits, then the value "00" of the TDRA bits can indicate a first value (denoted as $K_0 1$) of the offset indicator $K_0$ and a first value (denoted as SLIV1) of the SLIV, common to the first TRP 131 and the second TRP 132. The value "01" of the TDRA bits can indicate a second value (denoted as $K_0 2$) of the offset indicator $K_0$ and a second value (denoted as SLIV2) of the SLIV, common to the first TRP 131 and the second TRP 132. The value "10" of the TDRA bits can indicate a third value (denoted as $K_0 3$) of the offset indicator $K_0$ and a third value (denoted as SLIV3) of the SLIV, common to the first TRP 131 and the second TRP 132. The value "11" of the TDRA bits can indicate a fourth value (denoted as $K_0 4$) of the offset indicator $K_0$ and a fourth value (denoted as SLIV4) of the SLIV, common to the first TRP 131 and the second TRP 132.

On the other hand, if the network device 110 indicates one DMRS group in the control information 135, then the network device 110 may need to use at least one value of the TDRA bits in the TDRA bitmap to indicate two TDRA values. The following Table 5 shows an example of such a TDRA bitmap when one DMRS group is indicated in the control information 135. In Table 5, the mapping from the values of the TDRA bits to the TDRA values is similar to the above Table 2, and thus the detailed description for Table 5 is omitted herein.

TABLE 5

An example TDRA field when one DMRS groups

| Code point of the TDRA field | TDRA value if 1 DMRS groups |
|---|---|
| 00 | {$K_0 1$/SLIV1} |
| 01 | {$K_0 2$/SLIV2, $K_0 3$/SLIV3} |
| 10 | {$K_0 4$/SLIV4} |
| 11 | {$K_0 5$/SLIV5, $K_0 6$/SLIV6} |

Similarly, if the network device 110 indicates two DMRS groups in the control information 135, then the network device 110 can use each value of the RV bits in the RV bitmap to indicate only one RV value. The following Table 6 shows an example of such a RV bitmap when two DMRS groups are indicated in the control information 135.

TABLE 6

An example RV field when two DMRS groups

| Code point of the RV field | RV value if 2 DMRS groups |
|---|---|
| 00 | {RV1} |
| 01 | {RV2} |
| 10 | {RV3} |
| 11 | {RV4} |

As illustrated in Table 6, in case the control information 135 indicates two DMRS groups and includes a RV bitmap of 2 bits, then the value "00" of the RV bits can indicate a first value (denoted as RV1) of the RV, common to the first TRP 131 and the second TRP 132. The value "01" of the RV bits can indicate a second value (denoted as RV2) of the RV, common to the first TRP 131 and the second TRP 132. The value "10" of the RV bits can indicate a third value (denoted as RV3) of the RV, common to the first TRP 131 and the second TRP 132. The value "11" of the RV bits can indicate a fourth value (denoted as RV4) of the RV, common to the first TRP 131 and the second TRP 132.

On the other hand, if the network device 110 indicates one DMRS group in the control information 135, then the network device 110 may need to use at least one value of the RV bits in the RV bitmap to indicate two RV values. The following Table 7 shows an example of such a RV bitmap when one DMRS group is indicated in the control information 135. In Table 7, the mapping from the values of the RV bits to the RV values is similar to the above Table 3, and thus the detailed description for Table 7 is omitted herein.

TABLE 7

An example RV field when one DMRS groups

| Code point of the RV field | RV value if 1 DMRS groups |
|---|---|
| 00 | {RV1} |
| 01 | {RV2} |
| 10 | {RV3, RV4} |
| 11 | {RV5, RV6} |

In some embodiments, the network device 110 can use the control information 135 (such as a DCI) together with another dedicated indicator (from a higher layer, for example) to inform the repetition scheme 150 to the terminal device 120. For example, the dedicated indicator can be used for indicating a particular repetition scheme, and thus simplifying the design of the control information 135 for indicating the repetition scheme 150. In some embodiments, the dedicated indicator can be carried in a RRC message or a MAC CE message. This indicating approach using both the control information 135 and the dedicated indicator may be referred to as a hybrid approach. With the hybrid approach, the design of the control information 135 can be simplified.

In particular, the network device 110 may transmit to the terminal device 120 a dedicated indicator for distinguishing between the two FDM schemes. The dedicated indicator can explicitly indicate one of the first FDM scheme 320 and the second FDM scheme 330. In other words, when the terminal device 120 can determine the repetition scheme 150 as a FDM scheme, the dedicated indicator can be further checked to distinguish between the first FDM scheme 320 and the second FDM scheme 330. Other repetition schemes, including the SDM scheme 310 and the two TDM schemes 340 and 350 can be indicated by the control information 135. With the help of the dedicated indicator for distinguishing between the two FDM schemes, the aforementioned Table 2 may become Table 8 as below. As can be seen from Table 8, the design of the control information 135 can be simplified.

then the network device 110 may indicate one DMRS group and two TDRAs in the control information 135. The one DMRS group is common to the first TRP 131 and the second TRP 132, and the two TDRAs are for the first TRP 131 and the second TRP 132, respectively. Further, if the network device 110 determines the repetition scheme 150 as the SDM scheme 310, then the network device 110 may indicate two DMRS groups in the control information 135.

In a similar manner, the network device 110 can use another dedicated indicator for distinguishing between the first TDM scheme 340 and the second TDM scheme 350. In particular, the network device 110 may transmit a dedicated offset indicator to the terminal device 120. The dedicated offset indicator can indicate an offset between a first time domain resource for the first TRP 131 and a second time domain resource for the second TRP 132. In other words, when the terminal device 120 can determine the repetition scheme 150 as a TDM scheme, the dedicated offset indicator can be checked to distinguish between the first TDM scheme 340 and the second TDM scheme 350.

For example, if the network device 110 determines the repetition scheme 150 as the first TDM scheme 340, the network device 110 can configure the dedicated offset indi-

TABLE 8

Numbers of transmission parameters when using dedicated indicator

| Transmission Parameter | SDM | First FDM | Second FDM | First TDM | Second TDM |
|---|---|---|---|---|---|
| FDRA | 1 | 1 (divided into 2 based on fixed or configured splitting) | 1 (divided into 2 based on fixed or configured splitting) | 1 | 1 |
| TDRA | 1 | 1 | 1 | 2 (higher layer configured two values) | 2 (higher layer configured two values) |
| DMRS group | 2 | 1 | 1 | 1 | 1 |
| RV | 1 | 1 | 2 | 2 | 2 |

Therefore, in case that the dedicated indicator for the first FDM scheme 320 and the second FDM scheme 330 is used, in generating the control information 135, if the network device 110 determines the repetition scheme 150 as the first FDM scheme 320 or the second FDM scheme 330, then the network device 110 can indicate one DMRS group and one TDRA in the control information 135, both common to the first TRP 131 and the second TRP 132.

Otherwise, if the network device 110 determines the repetition scheme 150 as a TDM scheme (for example, the first TDM scheme 340 or the second TDM scheme 350), cator to indicate an offset less than one time slot. Otherwise, if the network device 110 determines the repetition scheme 150 as the second TDM scheme 350, the network device 110 can configure the dedicated offset indicator to indicate an offset greater than one time slot. With the help of both the dedicated indicator for two FDM schemes and the dedicated offset indicator for two TDM schemes, the aforementioned Table 2 may become Table 9 as below. As can be seen from Table 9, the design of the control information 135 can be simplified.

TABLE 9

Numbers of transmission parameters when using two dedicated indicators

| Transmission Parameter | SDM | First FDM | Second FDM | First TDM | Second TDM |
|---|---|---|---|---|---|
| FDRA | 1 | 1 (divided into 2 based on fixed or configured splitting) | 1 (divided into 2 based on fixed or configured splitting) | 1 | 1 |
| TDRA | 1 | 1 | 1 | 1 | 1 |
| DMRS groups | 2 | 1 | 1 | 1 | 1 |
| RV | 1 | 1 | 2 | 2 | 2 |

Therefore, in case that both the dedicated indicator for the two FDM schemes and the dedicated offset indicator for the two TDM schemes are used, in generating the control information 135, if the network device 110 determines the repetition scheme 150 as the first TDM scheme 340 or the second TDM scheme 350, then the network device 110 can indicate one DMRS group and one TDRA in the control information 135, both common to the first TRP and the second TRP. More specifically, the first time domain resource for one of the first TRP 131 and the second TRP 132 can be indicated by the one TDRA, and the second time domain resource for the other one of the first TRP 131 and the second TRP 132 can be indicated by the first time resource and the offset. In this way, the network device 110 can use only one TDRA for indicating two TDRA values.

If the network device 110 determines the repetition scheme 150 as the first FDM scheme 320 or the second FDM scheme 330, then the network device 110 can also indicate one DMRS group and one TDRA in the control information 135, both common to the first TRP 131 and the second TRP 132, but set the dedicated indicator to indicate one of the first FDM scheme 320 and the second FDM scheme 330, without transmitting the dedicated offset indicator for the two TDM schemes. Further, if the network device 110 determines the repetition scheme 150 as the SDM scheme 310, then the network device 110 may indicate two DMRS groups in the control information 135.

As an alternative to implicitly indicating the repetition scheme 150 through different numbers of some transmission parameters, the network device 110 can explicitly indicate one of the available repetition schemes. As such, the determination of the repetition scheme 150 at the terminal device 120 can be simplified. For example, the network device 110 may include a repetition scheme bitmap in the control information 135. The repetition scheme bitmap can be used for indicating the repetition scheme 150 among a plurality of repetition schemes. In some embodiments, the control information 135 may be a RRC message, which configures one or more of the following indicators.

```
URLLC_mode
{
  Mode_select bitmap of {URLLC_SDM, URLLC_FDM1,
URLLC_FDM2, URLLC_TDM1, URLLC_TDM2}
}
``` where the indicator "URLLC_SDM" corresponds to the SDM scheme 310, the indicator "URLLC_FDM1" corresponds to the first FDM scheme 320, the indicator "URLLC_FDM2" corresponds to the second FDM scheme 330, the indicator "URLLC_TDM1" corresponds to the first TDM scheme 340, and the indicator "URLLC_TDM2" corresponds to the second TDM scheme 350.

In some other embodiments, the control information 135 may be a MAC CE message, which activates or deactivates one or more of the repetition schemes. The following Table 10 shows such a bitmap for repetition schemes to be carried in a MAC CE message.

TABLE 10

An example of explicit bitmap for repetition schemes

| Field | SDM | First FDM | Second FDM | First TDM | Second TDM |
|---|---|---|---|---|---|
| Bitmap | 1/0 | 1/0 | 1/0 | 1/0 | 1/0 |

After generating the control information 135, the network device 110 transmits 215 the control information 135 to the terminal device 120. For example, the network device 110 may transmit the control information 135 via the first TRP 131, the second TRP 132, or both of them. In some other embodiments, the network device 110 can transmit the control information 135 via other TRP(s) not shown in FIG. 1.

Accordingly, at the receiving side, the terminal device 120 can receive 215 the control information 135 from the network device 110, and may be aware of that the data 140 is to be transmitted to itself and, for example, can obtain various transmission parameters of the transmission of the data 140. Further, since the network device 110 configures the control information 135 to indicate the repetition scheme 150 to be used by the network device 110 to transmit the data 140, upon receiving the control information 135, the terminal device 120 can determine 220 the repetition scheme 150 from the control information 135.

It is to be appreciated that a determining manner used by the terminal device 120 to determine the repetition scheme 150 from the control information 135 may correspond to an indicating manner employed by the network device 110 to indicate the repetition scheme 150 in the control information 135. Therefore, the different determining manners used by the terminal device 120 will not be detailed below, and they can be well understood with reference to the above description of the various indicating manners used by the network device 110.

For example, in determining the repetition scheme 150 from the control information 135, if the control information 135 indicates two DMRS groups, the terminal device 120 can determine the repetition scheme 150 as the SDM scheme 310. If the control information 135 indicates one DMRS group and one RV, the terminal device 120 can determine the repetition scheme 150 as the first FDM scheme 310. If the control information 135 indicates one DMRS group, two RVs, and one TDRA, the terminal device 120 can determine the repetition scheme 150 as the second FDM scheme 330.

If the control information 135 indicates one DMRS group, two RVs, and two TDRAs, the terminal device 120 can determine the repetition scheme 150 as a TDM scheme. Further, if the two TDRAs in the control information 135 indicate two time domain resources in one time slot, the terminal device 120 may determine the TDM scheme as the first TDM scheme 340. Otherwise, if the two TDRAs in the control information 135 indicate two time domain resources in respective different time slots, the terminal device 120 may determine the TDM scheme as the second TDM scheme 350.

In some embodiments, the control information 135 may comprise a TDRA bitmap. The terminal device 120 can determine that a first value of the TDRA bitmap indicates one TDRA value common to the two TRPs 131 and 132, and a second value of the TDRA bitmap indicates respective TDRA values for the two TRPs 131 and 132. In other words, some values of the TDRA bitmap may indicate only one TDRA value, whereas some other values of the TDRA bitmap may indicate two TDRA values. For example, a mapping of the TDRA bitmap can be indicated by a higher layer than a PHY layer.

In some embodiments, the control information 135 may comprise a RV bitmap. The terminal device 120 can determine that a first value of the RV bitmap indicates one RV value common to the two TRPs 131 and 132, and a second value of the RV bitmap indicates respective RV values for the two TRPs 131 and 132. In other words, some values of the RV bitmap may indicate only one RV value, whereas some other values of the RV bitmap may indicate two RV values. For example, a mapping of the RV bitmap can be indicated by a higher layer than a PHY layer.

In some embodiments, if the network device 110 employs a TDRA bitmap depending on the number of DMRS groups, the terminal device 120 can use the number of the DMRS groups in the control information 135 to determine whether a value of the TDRA bits in the control information 135 represents one TDRA value or two TDRA values.

If the control information 135 indicates two DMRS groups, the terminal device 120 can determine that each value of the TDRA bitmap indicates one TDRA value. If the control information 135 indicates one DMRS group, the terminal device 120 can determine a value of the TDRA bitmap indicates two TDRA values. In other words, some values of the TDRA bitmap may indicate only one TDRA value, whereas some other values of the TDRA bitmap may indicate two TDRA values.

Similarly, if the network device 110 employs a RV bitmap depending on the number of DMRS groups, the terminal device 120 can use the number of the DMRS groups in the control information 135 to determine whether a value of the RV bits in the control information 135 represents one RV value or two RV values.

If the control information 135 indicates two DMRS groups, the terminal device 120 can determine that each value of the RV bitmap indicates one RV value. If the control information 135 indicates one DMRS group, the terminal device 120 can determine a value of the RV bitmap indicates two RV values. In other words, some values of the RV bitmap may indicate only one RV value, whereas some other values of the RV bitmap may indicate two RV values.

In some embodiments, the terminal device 120 may receive a dedicated indicator from the network device 110. The dedicated indicator may be dedicated for indicating the first FDM scheme 320 or the second FDM scheme 330. In this event, in determining the repetition scheme 150, in the case that the control information 135 indicates one DMRS group and one TDRA, if the dedicated indicator indicates the first FDM scheme 330, then the terminal device 120 may determine the repetition scheme 150 as the first FDM scheme 330. Otherwise, if the dedicated indicator indicates the second FDM scheme 340, then the terminal device 120 may determine the repetition scheme 150 as the second FDM scheme 340.

Moreover, if the control information 135 indicates one DMRS group and two TDRAs, the terminal device 120 can determine the repetition scheme 150 as a TDM scheme. In this event, the terminal device 120 may further determine the TDM scheme as one of the first TDM scheme 340 and the second TDM scheme 350, based on an offset indicator (such as, $K_0$) in the TDRA field of the control information 135.

Alternatively, if the network device 110 uses a dedicated offset indicator to distinguish between the first TDM scheme 340 and the second TDM scheme 350, the terminal device 120 can receive the dedicated offset indicator from the network device 110 in addition to receiving the control information 135. In this event, in determining the repetition scheme 150, in case the control information 135 indicates one DMRS group and one TDRA, if the dedicated offset indicator indicates an offset less than one time slot, then the terminal device 120 can determine the repetition scheme 150 as the first TDM scheme 340. Otherwise, if the dedicated offset indicator indicates an offset greater than one time slot, then the terminal device 120 can determine the repetition scheme 150 as the second TDM scheme 350.

Although the control information 135 indicates only one TDRA, the terminal device 120 may determine the first time domain resource for one of the first TRP 131 and the second TRP 132 based on the one TDRA. For example, the one TDRA can directly indicate the first time domain resource. Further, the terminal device 120 may determine the second time domain resource for the other one of the first TRP 131 and the second TRP 132 based on the first time domain resource and the offset.

In some embodiments, the control information 135 may comprise a repetition scheme bitmap for indicating the repetition scheme 150 among a plurality of repetition schemes. In this event, the control information 135 can be a RRC message or a MAC CE message from a higher layer than the PHY layer. In these embodiments, the terminal device 120 can determine the repetition scheme 150 according to an explicit indication of the repetition scheme bitmap.

After transmitting the control information 135 to the terminal device 120, the network device 110 can then transmit 225 the data 140 to the terminal device 120 via the first TRP 131 and the second TRP 132 based on the repetition scheme 150. For example, the network device 110 may use one of the aforementioned repetition schemes to transmit the data 140 to the terminal device 120 via the two TRPs 131 and 132. Accordingly, at the receiving side, after determining the repetition scheme 150 employed by the network device 110, the terminal device 120 can properly receive 225 the data 140 from the network device 110 based on the repetition scheme 150.

Hereinbefore, some embodiments of the present disclosure are described in connection with how the network device 110 indicates to the terminal device 120 the repetition scheme 150 to be used by the network device 110 to transmit the data 140 via the first TRP 131 and the second TRP 132. Hereinafter, with reference to FIGS. 4 to 8, some other embodiments of the present disclosure will be described in connection with how the network device 110 transmits different control information (for example, two DCIs) via the first TRP 131 and the second TRP 132, respectively, and how the terminal device 120 receives different control information (for example, two DCIs) transmitted via the first TRP 131 and the second TRP 132, respectively.

In general, in communications between the network device 110 and the terminal device 120, the network device 110 may transmit a DCI to schedule a data transmission from the network device 110 to the terminal device 120. For example, the network device 110 may transmit a first DCI to schedule a transmission of first data from the network device 110 to the terminal device 120, and transmit a second DCI to schedule a transmission of second data from the network device 110 to the terminal device 120.

For the first data, the terminal device 120 may transmit a first feedback (for example, a Hybrid Automatic Repeat Request, HARQ, Acknowledgement/Negative Acknowledgement, ACK/NACK, feedback) to the network device 110 indicating whether the first data is successfully received by the terminal device 120. Similarly, for the second data, the terminal device 120 may also transmit a second feedback to the network device 110 indicating whether the second data is successfully received by the terminal device 120.

For the first feedback to be transmitted by the terminal device 120 for the first data, the first DCI can indicate a first feedback channel (for example, the Physical Uplink Control Channel, PUCCH) for carrying the first feedback. Similarly, for the second feedback to be transmitted by the terminal device 120 for the second data, the second DCI can indicate a second feedback channel for carrying the second feedback.

In some cases, the terminal device 120 can use only one of the first feedback channel and the second feedback channel to transmit both the first feedback and the second feedback to the network device 110. Traditionally, a network device may only be coupled with one TRP, and thus the two DCIs cannot be transmitted at the same time. In other words, the two DCIs are transmitted one after another in time domain. Therefore, a terminal device can determine which DCI among the first DCI and the second DCI is the later one in time domain. It is assumed here that the second DCI is the later one without loss of generality. Then, the terminal device can use the second feedback channel indicated in the second DCI to transmit both the first feedback and the second feedback.

However, in the case that the network device 110 is coupled with two TRPs 131 and 132, the network device 110 can transmit the first DCI and the second DCI via the first TRP 131 and the second TRP 132, respectively. Thus, there is a possibility that the first DCI and the second DCI are transmitted at the same time, such that the terminal device 120 cannot determine which of the first DCI and the second DCI is the later one. In such a case, the terminal device 120 cannot determine which feedback channel should be used to transmit both the first feedback and the second feedback. Some aspects of the present disclosure solve these and other possible issues in the traditional solutions. Embodiments of these aspects of the present disclosure will be described in detail below with reference to FIGS. 4-5.

Figure 4:
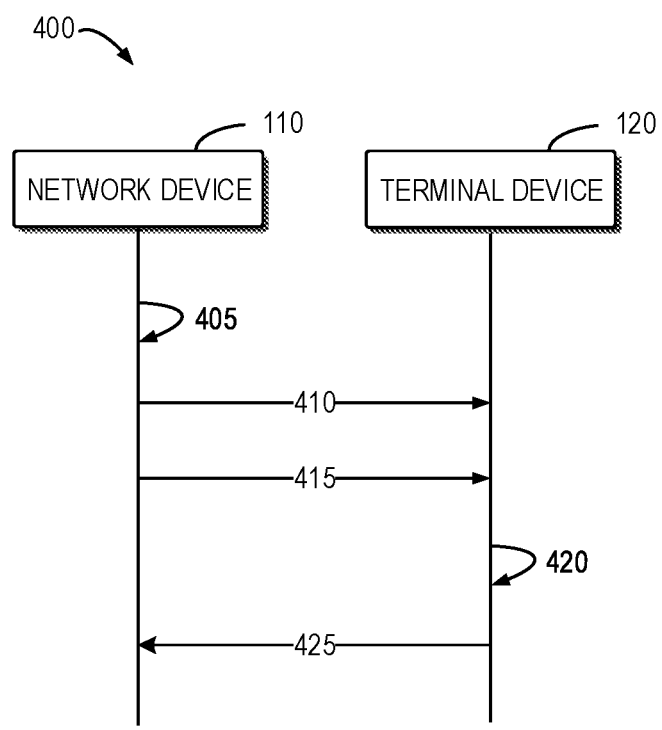
FIG. 4 shows another example communication process between a network device and a terminal device in accordance with some embodiments of the present disclosure.

FIG. 4 shows another example communication process 400 between the network device 110 and the terminal device 120 in accordance with some embodiments of the present disclosure. In the following, embodiments of the present disclosure will be described with reference to the communication environment 100 as shown in FIG. 1, in which the network device 110 is coupled with two TRPs 131 and 132. However, it should be appreciated that embodiments of the present disclosure are equally applicable to the cases where the network device 110 is coupled with three or more TRPs.

As shown in FIG. 4, the network device 110 generates 405 first control information associated with first data to be transmitted from the network device 110 to the terminal device 120 and second control information associated with second data to be transmitted from the network device 110 to the terminal device 120. In some embodiments, the first control information and the second control information may be DCIs as defined in the 3GPP specifications. In other embodiments, the first control information and the second control information can be any other existing or future control information defined or undefined in 3GPP standards or any other standards.

In some embodiments, the first control information and the second control information are to be transmitted by the network device 110 via the first TRP 131 and the second TRP 132, respectively. In addition, a first starting time point of the first control information and a second starting time point of the second control information are within one time interval for the terminal device 120 to monitor control information from the network device 110. In other words, the terminal device 120 cannot determine which one of the first control information and the second control information is the later one. This situation will be further explained below with reference to FIG. 5.

Figure 5:
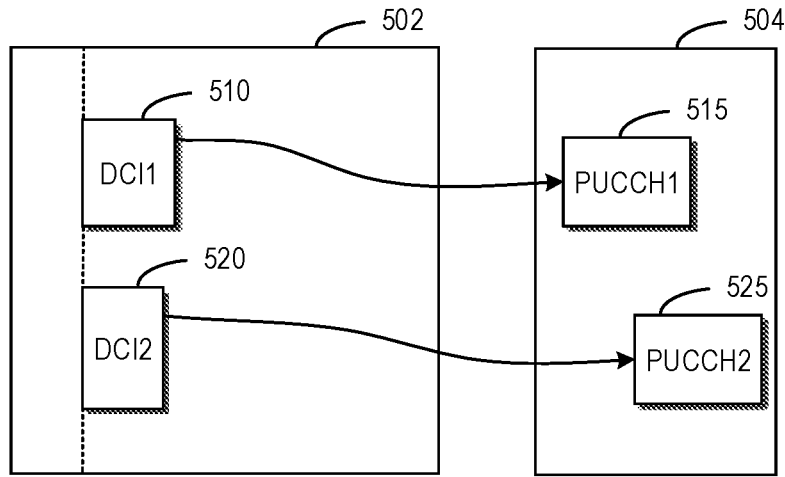
FIG. 5 shows an example scenario where two DCIs are transmitted by a network device via two TRPs within a same time interval, in accordance with some embodiments of the present disclosure.

FIG. 5 shows an example scenario where two DCIs 510 and 520 are transmitted by the network device 110 via two TRPs 131 and 132 within a same time interval, in accordance with some embodiments of the present disclosure. As shown in FIG. 5, the network device 110 transmits a first DCI1 510 in a first time slot 502. The first DCI1 510 schedules a first PUCCH1 515 in a second time slot 504 for the terminal device 120 to transmit a first feedback. The first feedback is for first data transmitted from the network device 110 to the terminal device 120 scheduled by the first DCI1 510. In addition, the network device 110 transmits a second DCI2 520 in the first time slot 502. The second DCI2 520 schedules a second PUCCH2 525 in a second time slot 504 for the terminal device 120 to transmit a second feedback. The second feedback is for second data transmitted from the network device 110 to the terminal device 120 scheduled by the second DCI2 520.

In the case that multiple DCIs are received from each TRP indicating the same PUCCH in a slot, the terminal device 120 firstly determines a PUCCH resource for each TRP, based on the DCIs associated with the same TRP and indicating a PUCCH in the same slot. Then the terminal device 120 checks whether the determined PUCCHs from different TRPs are overlapped in one slot or not. If there is an overlapping, the PUCCH is further determined based on the last DCI among different TRPs.

Further, the first starting time point of the DCI1 510 and the second starting time point of the DCI2 520 are within one time interval for the terminal device 120 to monitor a DCI from the network device 110, such that the terminal device 120 cannot determine which one of the DCI1 510 and the DCI2 520 is the later one in time domain. For example, as schematically illustrated, the DCI1 510 and the DCI2 520 may have the same starting time point, and thus the terminal device 120 cannot determine which PUCCH of the PUCCH1 515 and the PUCCH2 525 should be used to transmit both the first feedback and the second feedback. In some embodiments, the time interval can correspond to an Orthogonal Frequency Division Multiplexing (OFDM) symbol or a Physical Downlink Control Channel (PDCCH) monitoring occasion, as defined in the 3GPP specifications.

In order to enable the terminal device 120 to determine which control information schedules the feedback channel to be used to transmit both the first and second feedbacks, the network device 110 can select target control information among the first control information and the second control information, and may use the selected target control information to indicate the feedback channel for the terminal device 120 to transmit the first feedback for the first data and the second feedback for the second data. Then, the network device 110 can transmit the target control information based on a pre-defined transmission criterion, which is known to both the network device 110 and the terminal device 120, such that the terminal device 120 can identify the target control information among the first control information and the second control information.

Therefore, referring back to FIG. 4, the network device 110 transmits 410, via one of the first TRP 131 and the second TRP 132, the target control information to the terminal device 120 based on the transmission criterion. In some embodiments, the transmission criterion can be selected from various available transmission criteria or may be a combination of more than one of the available transmission criteria. For example, the network device 110 may transmit the target control information via a pre-defined TRP, such as the first TRP 131, and thus the terminal device 120 can determine that the control information transmitted via the first TRP 131 is the target control information. The pre-defined TRP may be a TRP associated with a lowest higher-layer configured index. The RRC signaling may be used to configure an index associated with a TRP.

Alternatively or additionally, the network device 110 may transmit the target control information in a CORESET or CORESET groups, and thus the terminal device 120 can determine that the control information transmitted in the pre-defined CORESET or CORESET groups is the target control information. The definition of the CORESET can be found in the 3GPP specifications. The CORESET groups can be multiple CORESETs associated with the same higher-layer configured index, which is used to identify a TRP. Alternatively or additionally, the network device 110 may transmit the target control information using a CORESET with a lower index, and thus the terminal device 120 can determine that the control information transmitted in a CORESET with a lower index is the target control information.

Alternatively or additionally, the network device 110 may transmit the target control information in a Search Space (SS) of the terminal device 120 with a lower index, and thus the terminal device 120 can determine that the control information transmitted in the SS with a lower index is the target control information. The definition of the SS can be found in the 3GPP specifications. Alternatively or additionally, the network device 110 may transmit the target control information in a PDCCH with a greater monitoring index. The monitoring index of a PDCCH may refer to an index of the serving cell for transmitting the PDCCH among a plurality of serving cells, or an index of the TRP for transmitting the PDCCH among a plurality of TRPs, or the like. Thus, the terminal device 120 can determine that the control information transmitted in the PDCCH with a greater monitoring index is the target control information.

Alternatively or additionally, the network device 110 may transmit the target control information in a PDCCH with a later end time point, and thus the terminal device 120 can determine that the control information transmitted in the PDCCH with a later end time point is the target control information. Alternatively or additionally, the network device 110 may transmit the target control information in a PDCCH with a greater DAI, and thus the terminal device 120 can determine that the control information transmitted in the PDCCH with a greater DAI is the target control information.

In addition to transmitting the target control information via one of the first TRP 131 and the second TRP 132, the network device 110 transmits 415, via the other one of the first TRP 131 and the second TRP 132, the other control information of the first control information and the second control information to the terminal device 120. Accordingly, at the receiving side, it is assumed here that the terminal device 120 receives 410 from the network device 110 first control information associated with the first data to be transmitted from the network device 110 to the terminal device 120, without loss of generality. In addition, the terminal device 120 receives 415 from the network device 110 second control information associated with the second data to be transmitted from the network device 110 to the terminal device 120.

As mentioned, the first control information and the second control information are transmitted by the network device 110 via a first TRP 131 and a second TRP 132, respectively. The first starting time point of the first control information and the second starting time point of the second control information are within one time interval for the terminal device 120 to monitor control information from the network device 110, such that the terminal device 120 cannot determine which of the first control information and the second control information is the later one in time domain.

However, since the terminal device 120 knows the transmission criterion of the target control information, the terminal device 120 can select 420 the target control information from the first control information and the second control information, based on the transmission criterion. In some embodiments, if the transmission criterion is transmitting the target control information via a pre-defined TRP, then the terminal device 110 may select the control information transmitted via the pre-defined TRP as the target control information.

Alternatively or additionally, if the transmission criterion is transmitting the target control information in a pre-defined CORESET, then the terminal device 110 may select the control information transmitted in the pre-defined CORESET as the target control information. Alternatively or additionally, if the transmission criterion is transmitting the target control information using a CORESET with a lower index, then the terminal device 110 may select the control information transmitted using the CORESET with a lower index as the target control information.

Alternatively or additionally, if the transmission criterion is transmitting the target control information in a SS of the terminal device 120 with a lower index, then the terminal device 110 may select the control information searched in the SS with a lower index as the target control information. Alternatively or additionally, if the transmission criterion is transmitting the target control information in a PDCCH with a greater monitoring index, then the terminal device 110 may select the control information transmitted in the PDCCH with a greater monitoring index as the target control information.

Alternatively or additionally, if the transmission criterion is transmitting the target control information in a PDCCH with a later end time point, then the terminal device 110 may select the control information transmitted in the PDCCH with a later end time point as the target control information. Alternatively or additionally, if the transmission criterion is transmitting the target control information in a PDCCH with a greater DAI, then the terminal device 110 may select the control information transmitted in the PDCCH with a greater DAI as the target control information.

After determining the target control information among the first control information and the second control information, the terminal device 120 transmits 425, to the network device 110, the first feedback for the first data and the second feedback for the second data on the feedback channel indicated in the target control information. In this way, the terminal device 120 can determine the control information (for example, a DCI) indicating the feedback channel (for example, a PUCCH) for transmitting a plurality of feedbacks (for example, an ACK/NACK), even if the control information is transmitted at the same time with further control information (for example, another DCI).

As described above, the DAI as defined in the 3GPP specifications carried in a DCI may be an index of the DCI, which can help a terminal device to determine whether a set of DCIS has been successfully received. For example, if the network device 110 transmits to the terminal device 120 four DCIs in one serving cell successively in time domain. The network device 110 may configure the first DCI to have a DAI value of 1, the second DCI to have a DAI value of 2, the third DCI to have a DAI value of 3, and the fourth DCI to have a DAI value of 4. In some cases, the DAI value may have a maximum value of 4, and the DCI next to the DCI having a DAI value of 4 is to again be assigned with a DAI value of 1.

At the receiving side, as an illustrative example, if the terminal device 110 only receives a DCI having a DAI value of 1, a DCI having a DAI value of 2, and a DCI having a DAI value of 4 successively in time domain, then the terminal device 110 can determine that a DCI having a DAI value of 3 is lost. As another illustrative example, if the terminal device 110 only receives a DCI having a DAI value of 3, a DCI having a DAI value of 4, and a DCI having a DAI value of 2 successively in time domain, then the terminal device 110 can determine that a DCI having a DAI value of 1 is lost.

However, in the case that the network device 110 is coupled with two TRPs 131 and 132, there is a possibility that two DCIs are transmitted via the first TRP 131 and the second TRP 132, respectively, in a same cell and within a same time interval for the terminal device 120 to monitor a DCI from the network device 110. In other words, the terminal device 120 will consider the two DCIs as being received at the same time. Without loss of generality, it is assumed here that the two DCIs have a DAI value of 2 and a DAI value of 3, respectively.

In traditional solutions, if a terminal device first decodes the DCI with the DAI value of 2 and then decodes the DCI with the DAI value of 3, then the terminal device may consider that the DAIs of the DCIs have a correct order of {2, 3} and there is no DCI being lost. Otherwise, if the terminal device first decodes the DCI with the DAI value of 3 and then decodes the DCI with the DAI value of 2, then the terminal device may consider that the DAIs of the DCIs have an order of {3, 2} and there are two DCIs being lost, that is, a DCI with a DAI value of 4 and a DCI with a DAI value of 1 are lost. Some aspects of the present disclosure solve these and other possible issues in the traditional solutions. Embodiments of these aspects will be described in detail below with reference to FIGS. 6-8.

As a first option for solving the above discussed problems, the network device 110 can still has no TRP order for transmitting DCIs with respective DAIs in a same serving cell and the DAI values can be sorted at the receiving side by the terminal device 120. In this way, even if a plurality of DCIs are transmitted in a same cell and within a same time interval for the terminal device 120 to monitor a DCI, the terminal device 120 can still obtain a correct order of the plurality of DCIS. This first option will be detailed with reference to FIG. 6.

Figure 6:
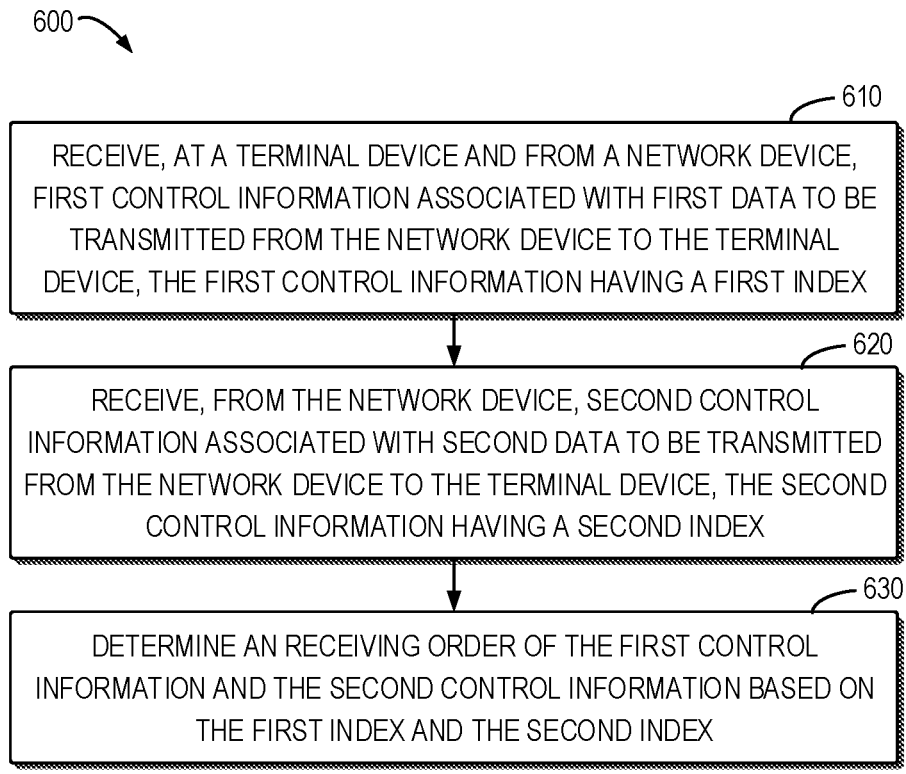
FIG. 6 shows a flowchart of an example method in accordance with some embodiments of the present disclosure.

FIG. 6 shows a flowchart of an example method 600 in accordance with some embodiments of the present disclosure. In some embodiments, the method 600 can be implemented at a terminal device, such as the terminal device 120 as shown in FIG. 1. Additionally or alternatively, the method 600 can also be implemented at other terminal devices not shown in FIG. 1. For the purpose of discussion, the method 600 will be described with reference to FIG. 1 as performed by the terminal device 120 without loss of generality.

At block 610, the terminal device 120 receives first control information from the network device 110. The first control information is associated with first data to be transmitted from the network device 110 to the terminal device 120 and has a first index. For example, in the example scenario as shown in FIG. 5, the terminal device 120 may receive a first DCI1 510 from the network device 110, and the DCI1 510 may have a first DAI value.

Referring back to FIG. 6, at block 620, the terminal device 120 receives second control information from the network device 110. The second control information is associated with second data to be transmitted from the network device 110 to the terminal device 120 and has a second index. For example, in the example scenario as shown in FIG. 5, the terminal device 120 may receive a second DCI2 520 from the network device 110, and the DCI2 520 may have a second DAI value.

As described above, the first control information and the second control information are transmitted by the network device 110 via the first TRP 131 and the second TRP 132, respectively. The first starting time point of the first control information and the second starting time point of the second control information are within one time interval for the terminal device 120 to monitor control information from the network device 110, such that the terminal device 120 cannot determine the order of the first control information and the second control information in time domain. For example, in the example scenario as shown in FIG. 5, the DCI1 510 and the DCI2 520 may be transmitted at the same time.

Referring back to FIG. 6, at block 630, the terminal device 120 determines a receiving order of the first control information and the second control information based on the first index and the second index. In other words, the terminal device 120 determines which control information is received first according to the first and second indexes, rather than according to the decoding order of the first control information and the second control information. For example, in the example scenario as shown in FIG. 5, if the DCI1 510 has a DAI value of 2 and the DCI2 520 has a DAI value of 3, then the terminal device 120 can determine that the DCI1 510 is received before the DCI2 520, since it has the DAI value of 2 prior to the DAI value of 3, even if the DCI 510 is decoded after the DCI2 520. Then, the terminal device 120 can determine an ACK/NACK codebook based on the sorted DAI values of the DCIs received in a same serving cell and within the same time interval.

As a second option for solving the above discussed problems, the network device 110 can has a particular TRP order for transmitting DCIs with respective DAIs in a serving cell and the DAI values can be sorted at the receiving side by the terminal device 120 based on indexes of the TRPs. In this way, a plurality of DCIs are transmitted by the network device 110 in a same cell, within a same time interval and in an order based on a TRP index, and thus the terminal device 120 can obtain a correct order of the plurality of DCIs also based on a TRP index. This second option will be detailed with reference to FIGS. 7 and 8.

Figure 7:
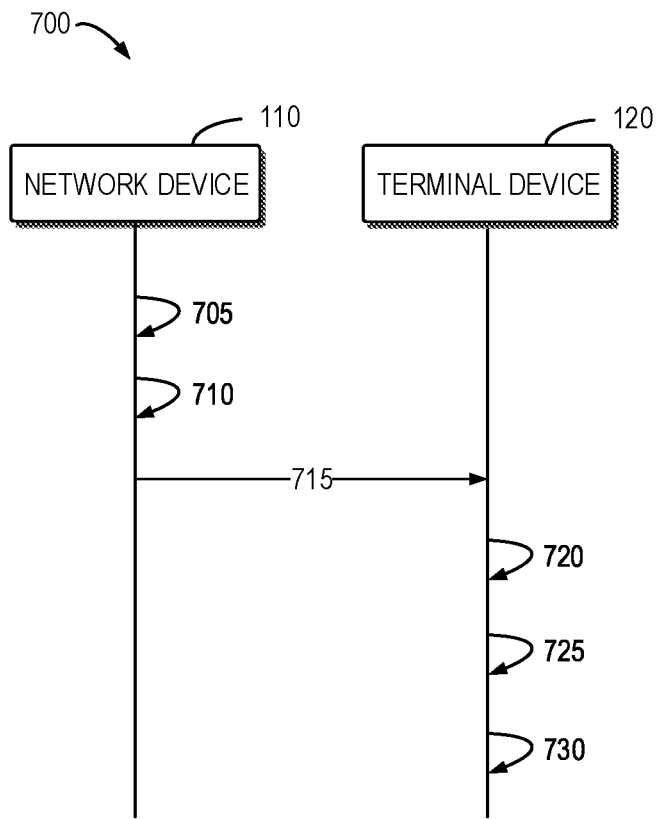
FIG. 7 shows another example communication process between a network device and a terminal device in accordance with some embodiments of the present disclosure.

FIG. 7 shows another example communication process 700 between the network device 110 and the terminal device 120 in accordance with some embodiments of the present disclosure. In the following, embodiments of the present disclosure will be described with reference to the communication environment 100 as shown in FIG. 1, in which the network device 110 is coupled with two TRPs 131 and 132. However, it should be appreciated that embodiments of the present disclosure are equally applicable to the cases where the network device 110 is coupled with three or more TRPs.

As shown, the network device 110 coupled with two TRPs 131 and 132 generates 705 control information associated with a transmission from the network device 110 to the terminal device 120. In some embodiments, the control information may be a DCI as defined in the 3GPP specifications. Then, the network device 110 determines 710 a first index for the control information based on a second index of a TRP via which the control information is to be transmitted. The second index of the TRP is to identify the TRP among the two TRPs 131 and 132. In some embodiments, the first index may be a DAI as defined in the 3GPP specifications. The determination of the first index is described in more detail below with reference to FIG. 8.

Figure 8:
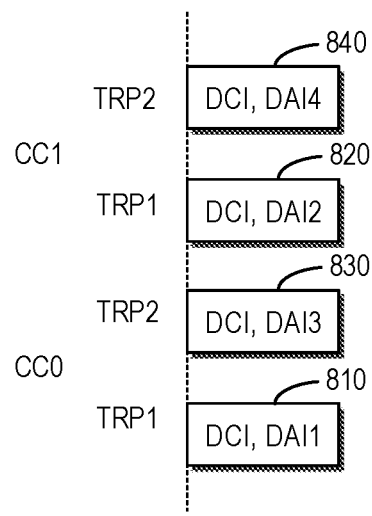
FIG. 8 shows an example diagram in which Downlink Assignment Indexes (DAIs) of different DCIs are determined based on indexes of TRPs in accordance with some embodiments of the present disclosure.

FIG. 8 shows an example diagram in which DAIs of different DCIs are determined based on indexes of TRPs in accordance with some embodiments of the present disclosure. In the example scenario as shown in FIG. 8, a DCI as defined in the 3GPP specifications is taken as an example of the control information, and a DAI value as defined in the 3GPP specifications is taken as an example of the first index of the control information. As shown, it is assumed here that the network device 110 has two serving cells, denoted as CC0 and CC1. In FIG. 8, the first TRP 131 is denoted as TRP1, and the second TRP 132 is denoted as TRP2. It is further assumed here that the network device 110 generates four DCIs, namely, a DCI 810, a DCI 820, a DCI 830, and a DCI 840.

In determining a DAI value for a DCI, the network device 110 can first consider an index of the serving cell to be used to transmit the DCI and then consider an index of the TRP via which the DCI is to be transmitted. For example, if the DCI 810 is to be transmitted in CC0 and via TRP1, then the DAI for DCI 810 can be determined as having value 1. If the DCI 820 is to be transmitted in CC1 and via TRP1, then the DAI for DCI 820 can be determined as having value 2. If the DCI 830 is to be transmitted in CC0 and via TRP2, then the DAI for DCI 830 can be determined as having value 3. If the DCI 840 is to be transmitted in CC1 and via TRP2, then the DAI for DCI 840 can be determined as having value 4. In other words, a DAI value of a DCI is determined based on an index of the TRP via which the DCI is to be transmitted.

In this manner, the terminal device 120 at the receiving side can correctly determine an order of two DCIs transmitted from the network device 110, even if the network device 110 transmits the two DCIs via the two TRPs 131 and 132, respectively, in one serving cell and at the same time. Although a DAI value is determined based on both an index of a serving cell and an index of a TRP in the example scenario as shown in FIG. 8, this is only an example without suggesting any limitations on the scope of the present disclosure. It is to be understood that the embodiments of the present disclosure equally applicable to the scenario where the DAI value is only determined based on an index of a TRP, or the scenario where the DAI value is determined also based on other indexes in addition to the serving cell index and the TRP index, such as an index of a PDCCH monitoring occasion, or the like.

Moreover, although a serving cell index is considered prior to a TRP index in determining a DAI value in the example scenario as shown in FIG. 8, this is only an example without suggesting any limitations on the scope of the present disclosure. It is to be understood that the embodiments of the present disclosure equally applicable to the scenario where various indexes, such as a serving cell index, a TRP index, and a PDCCH monitoring occasion index, can be considered in any order when determining a DAI value.

Referring back to FIG. 7, the network device 110 transmits 715 the control information including the first index to the terminal device 120 via the TRP having the second index. For example, as shown in FIG. 8, the network device 110 may transmit the DCI 810 including the DAI1 to the terminal device 120 via the first TRP 131 in the first serving cell CC0, transmit the DCI 820 including the DAI2 to the terminal device 120 via the first TRP 131 in the second serving cell CC1, transmit the DCI 830 including the DAI3 to the terminal device 120 via the second TRP 132 in the first serving cell CC0, and transmit the DCI 840 including the DAI4 to the terminal device 120 via the second TRP 132 in the second serving cell CC1.

Referring back to FIG. 7, at the receiving side, the terminal device 120 receives 715 the control information from the network device 110. For example, in the example scenario as shown in FIG. 8, the terminal device 120 may receive the DCI 810, the DCI 820, the DCI 830, and the DCI 840. Referring back to FIG. 7, the terminal device 120 determines 720 the first index for the control information from the control information. For example, in the example scenario as shown in FIG. 8, the terminal device 120 may determine the DAI1 from the DCI 810, the DAI2 from the DCI 820, the DAI3 from the DCI 830, and the DAI4 from the DCI 840.

Referring back to FIG. 7, the terminal device 120 determines 725 the second index of the TRP via which the control information is transmitted. For example, in the example scenario as shown in FIG. 8, the terminal device 120 may determine index 1 of the TRP 131 via which the DCI 810 is transmitted, index 1 of the TRP 131 via which the DCI 820 is transmitted, index 2 of the TRP 132 via which the DCI 830 is transmitted, and index 2 of the TRP 132 via which the DCI 840 is transmitted.

Referring back to FIG. 7, the terminal device 120 determines 730 a reception state of previous control information of the control information, based on the first index and the second index. For example, in the example scenario as shown in FIG. 8, the terminal device 120 may determine the order of the received DCIs as {DCI 810, DCI 820, DCI 830, DCI 840}, according to the indexes of the serving cells and the indexes of the TRPs. Also, the terminal device 120 may determine that the order of the DAI values {1, 2, 3, 4} of these DCIs is consistent with the order of the received DCIs. Therefore, upon receiving one of the DCIs, the terminal device 120 can determine a reception state of a previous DCI as not lost. In other words, there is no DCI being lost. Otherwise, if the order of the DAI values is inconsistent with the order of the received DCIs, the terminal device 120 may determine a reception state of a previous DCI as lost. That is, there are one or more DCIs being lost.

Figure 9:
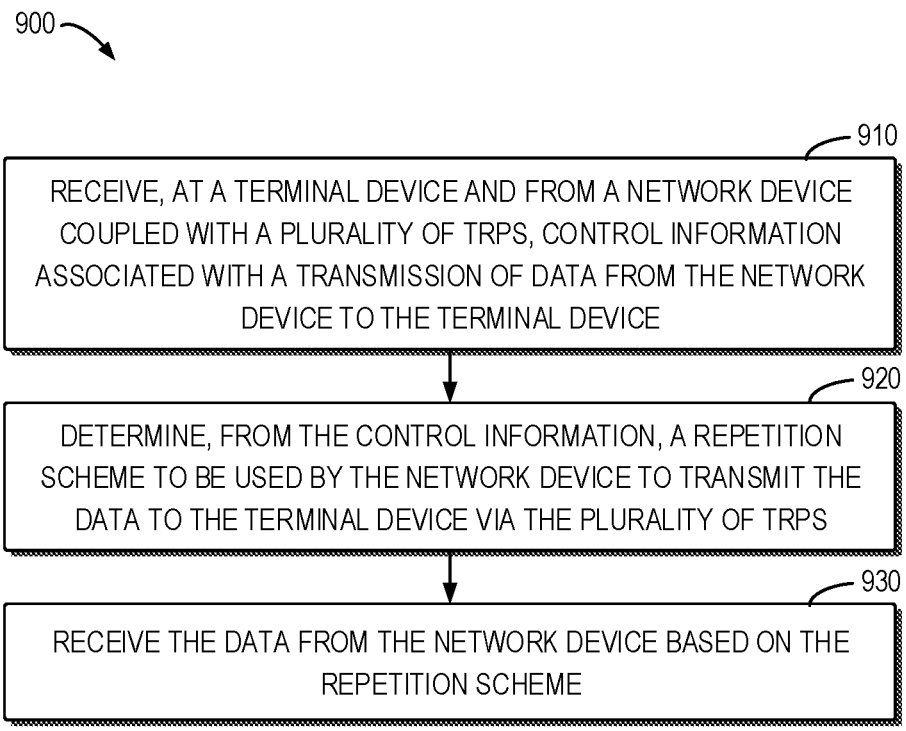
FIG. 9 shows a flowchart of another example method in accordance with some embodiments of the present disclosure.

FIG. 9 shows a flowchart of another example method 900 in accordance with some embodiments of the present disclosure. In some embodiments, the method 900 can be implemented at a terminal device, such as the terminal device 120 as shown in FIG. 1. Additionally or alternatively, the method 900 can also be implemented at other terminal devices not shown in FIG. 1. For the purpose of discussion, the method 900 will be described with reference to FIG. 1 as performed by the terminal device 120 without loss of generality.

At block 910, the terminal device 120 receives from the network device 110 coupled with a plurality of TRPs, control information associated with a transmission of data from the network device 110 to the terminal device 120. At block 920, the terminal device 120 determines, from the control information, a repetition scheme to be used by the network device 110 to transmit the data to the terminal device 120 via the plurality of TRPs. At block 930, the terminal device 120 receives the data from the network device 110 based on the repetition scheme.

In some embodiments, determining the repetition scheme may comprise: in response to a plurality of DMRS groups being indicated in the control information, determining the repetition scheme as a SDM scheme.

In some embodiments, determining the repetition scheme may comprise: in response to one DMRS group and one RV being indicated in the control information, determining the repetition scheme as a first FDM scheme, in which a same codeword of the data is transmitted via the plurality of TRPs transmit.

In some embodiments, determining the repetition scheme may comprise: in response to one DMRS group, a plurality of RVs, and one TDRA being indicated in the control information, determining the repetition scheme as a second FDM scheme, in which a plurality of codewords of the data are transmitted via the plurality of TRPs, respectively.

In some embodiments, determining the repetition scheme may comprise: in response to one DMRS group, a plurality of RVs, and a plurality of TDRAs being indicated in the control information, determining the repetition scheme as a TDM scheme.

In some embodiments, determining the repetition scheme may further comprise: in response to the plurality of TDRAs indicating a plurality of time domain resources in one time slot, determining the TDM scheme as a first TDM scheme, in which the data is transmitted via the plurality of TRPs within one time slot; and in response to the plurality of TDRAs indicating a plurality of time domain resources in respective different time slots, determining the TDM scheme as a second TDM scheme, in which the data is transmitted via the plurality of TRPs in respective different time slots.

In some embodiments, the control information may comprise at least one of a TDRA bitmap and a RV bitmap, and a first value of the TDRA bitmap indicates one TDRA value for the plurality of TRPs, and a second value of the TDRA bitmap indicates respective TDRA values for the plurality of TRPs; and a first value of the RV bitmap indicates one RV value for the plurality of TRPs, and a second value of the RV bitmap indicates respective RV values for the plurality of TRPs.

In some embodiments, a mapping of the TDRA bitmap or the RV bitmap may be indicated by a higher layer than a PHY layer.

In some embodiments, the method 900 may further comprise: in response to a plurality of DMRS groups being indicated in the control information, determining that each value of the TDRA bitmap indicates one TDRA value or each value of the RV bitmap indicates one RV value; and in response to one DMRS group being indicated in the control information, determining that a value of the TDRA bitmap indicates a plurality of TDRA values or a value of the RV bitmap indicates a plurality of RV values.

In some embodiments, the method 900 may further comprise: receiving, from the network device 110, an indicator for indicating a first FDM scheme or a second FDM scheme, a same codeword of the data being transmitted via the plurality of TRPs in the first FDM scheme, a plurality of codewords of the data being transmitted via the plurality of TRPs respectively in the second FDM scheme. Determining the repetition scheme may comprise: in response to one DMRS group and one TDRA being indicated in the control information, in response to the indicator indicating the first FDM scheme, determining the repetition scheme as the first FDM scheme; and in response to the indicator indicating the second FDM scheme, determining the repetition scheme as the second FDM scheme.

In some embodiments, determining the repetition scheme may further comprise: in response to one DMRS group and a plurality of TDRAs being indicated in the control information, determining the repetition scheme as a TDM scheme.

In some embodiments, the method 900 may further comprise: receiving, from the network device 110, an offset indicator indicating an offset between a first time domain resource for a first TRP of the plurality of TRPs and a second time domain resource for a second TRP of the plurality of TRPs. Determining the repetition scheme may comprise: in response to one DMRS group and one TDRA being indicated in the control information, in response to the offset being less than one time slot, determining the repetition scheme as a first TDM scheme, in which the data is transmitted via the first TRP and the second TRP within one time slot; and in response to the offset being greater than one time slot, determining the repetition scheme as a second TDM scheme, in which the data is transmitted via the first TRP and the second TRP within respective different time slots.

In some embodiments, the method 900 may further comprise: determining the first time domain resource based on the one TDRA; and determining the second time domain resource based on the first time domain resource and the offset.

In some embodiments, the control information may comprise a repetition scheme bitmap for indicating the repetition scheme among a plurality of repetition schemes.

Figure 10:
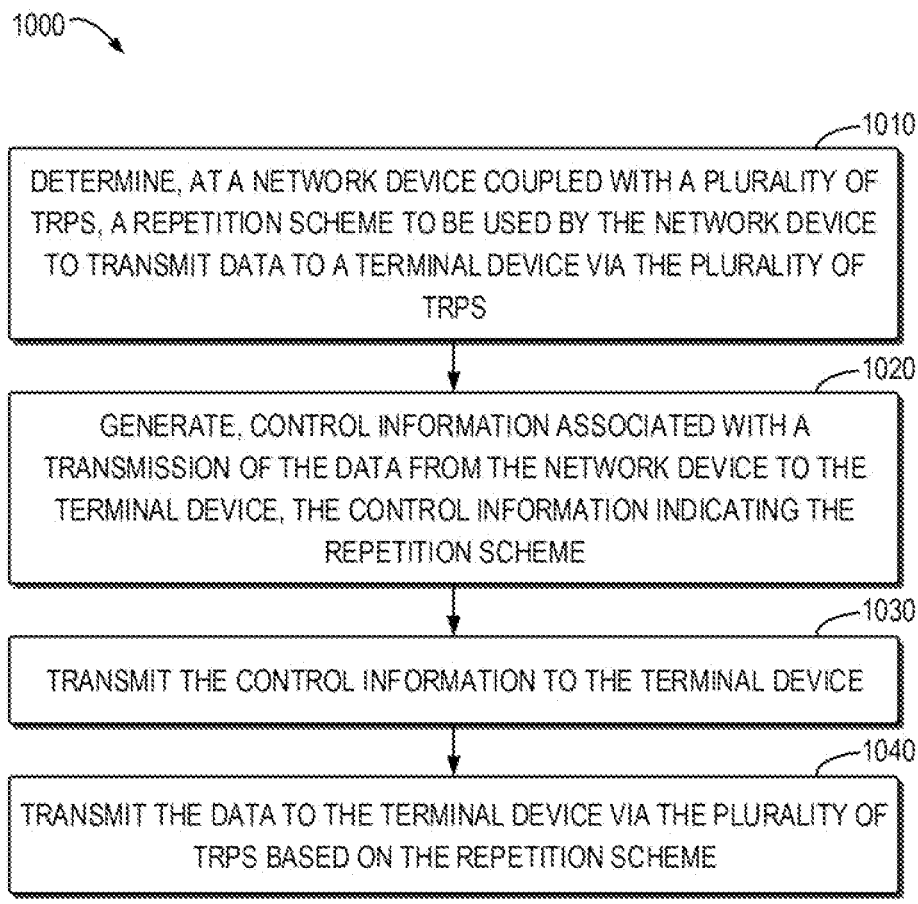
FIG. 10 shows a flowchart of another example method in accordance with some embodiments of the present disclosure.

FIG. 10 shows a flowchart of another example method 1000 in accordance with some embodiments of the present disclosure. In some embodiments, the method 1000 can be implemented at a network device, such as the network device 110 as shown in FIG. 1. Additionally or alternatively, the method 1000 can also be implemented at other network devices not shown in FIG. 1. For the purpose of discussion, the method 1000 will be described with reference to FIG. 1 as performed by the network device 110 without loss of generality.

At block 1010, the network device 110 coupled with a plurality of TRPs determines a repetition scheme to be used by the network device 110 to transmit data to the terminal device 120 via the plurality of TRPs. At block 1020, the network device 110 generates control information associated with a transmission of the data from the network device 110 to the terminal device 120, the control information indicating the repetition scheme. At block 1030, the network device 110 transmits the control information to the terminal device 120. At block 1040, the network device 110 transmits the data to the terminal device 120 via the plurality of TRPs based on the repetition scheme.

In some embodiments, generating the control information may comprise: in response to determining the repetition scheme as a SDM scheme, generating the control information indicating a plurality of DMRS groups.

In some embodiments, generating the control information may comprise: in response to determining the repetition scheme as a first FDM scheme, in which a same codeword of the data is transmitted via the plurality of TRPs, generating the control information indicating one DMRS group and one RV.

In some embodiments, generating the control information may comprise: in response to determining the repetition scheme as a second FDM scheme, in which respective codewords of the data are transmitted via the plurality of TRPs, generating the control information indicating one DMRS group, a plurality of RVs, and one TDRA.

In some embodiments, generating the control information may comprise: in response to determining the repetition scheme as a TDM scheme, generating the control information indicating one DMRS group, a plurality of RVs, and a plurality of TDRAs.

In some embodiments, if the TDM scheme is a first TDM scheme, in which the data is transmitted via the plurality of TRPs within one time slot, the plurality of TDRAs indicate a plurality of time domain resources in one time slot; and if the TDM scheme is a second TDM scheme, in which the data is transmitted via the plurality of TRPs in respective different time slots, the plurality of TDRAs indicate a plurality of time domain resources in respective different time slots.

In some embodiments, generating the control information may further comprise including at least one of a TDRA bitmap and a RV bitmap in the control information, and a first value of the TDRA bitmap indicates one TDRA value for the plurality of TRPs, and a second value of the TDRA bitmap indicates respective TDRA values for the plurality of TRPs; and a first value of the RV bitmap indicates one RV value for the plurality of TRPs, and a second value of the RV bitmap indicates respective RV values for the plurality of TRPs.

In some embodiments, a mapping of the TDRA bitmap or the RV bitmap may be indicated by a higher layer than a PHY layer.

In some embodiments, if a plurality of DMRS groups are indicated in the control information, each value of the TDRA bitmap may indicate one TDRA value or each value of the RV bitmap may indicate one RV value; and if one DMRS group is indicated in the control information, a value of the TDRA bitmap may indicate a plurality of TDRA values or a value of the RV bitmap may indicate a plurality of RV values.

In some embodiments, the method 1000 may further comprise: transmitting, to the terminal device 120, an indicator for indicating a first FDM scheme or a second FDM scheme, a same codeword of the data being transmitted via the plurality of TRPs in the first FDM scheme, and respective codewords of the data being transmitted via the plurality of TRPs in the second FDM scheme. Generating the control information may comprise: in response to determining the repetition scheme as the first FDM scheme or the second FDM scheme, generating the control information indicating one DMRS group and one TDRA.

In some embodiments, generating the control information may further comprise: in response to determining the repetition scheme as a TDM scheme, generating the control information indicating one DMRS group and a plurality of TDRAs.

In some embodiments, the method 1000 may further comprise: transmitting, to the terminal device 120, an offset indicator indicating an offset between a first time domain resource for a first TRP of the plurality of TRPs and a second time domain resource for a second TRP of the plurality of TRPs. Generating the control information may comprise: in response to determining the repetition scheme as a first TDM scheme, in which the data is transmitted via the first TRP and the second TRP within one time slot, or a second TDM scheme, in which the data is transmitted via the first TRP and the second TRP within respective different time slots, generating the control information indicating one DMRS group and one TDRA.

In some embodiments, the first time domain resource may be indicated by the one TDRA, and the second time domain resource may be indicated by the first time resource and the offset.

In some embodiments, generating the control information may comprise: including, the control information, a repetition scheme bitmap for indicating the repetition scheme among a plurality of repetition schemes.

Figure 11:
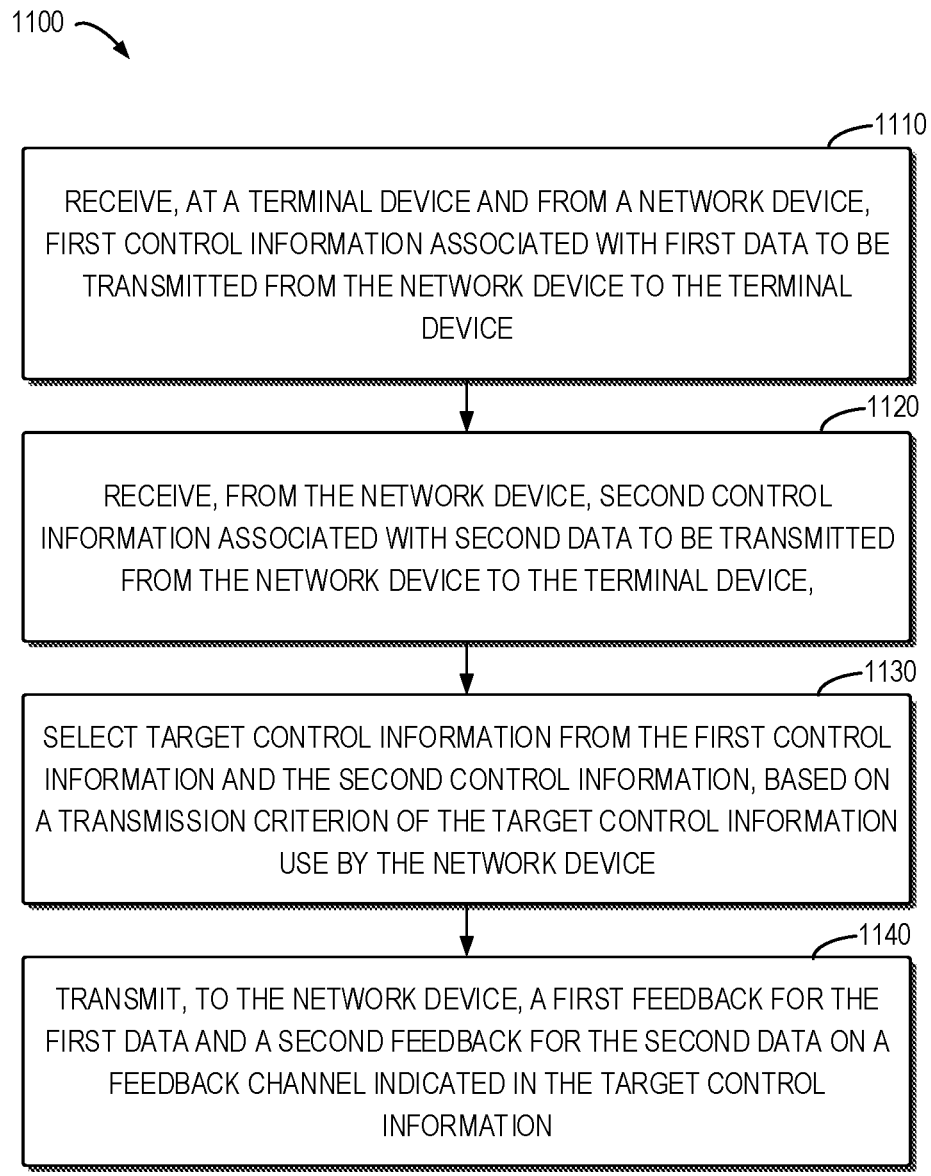
FIG. 11 shows a flowchart of another example method in accordance with some embodiments of the present disclosure.

FIG. 11 shows a flowchart of another example method 1100 in accordance with some embodiments of the present disclosure. In some embodiments, the method 1100 can be implemented at a terminal device, such as the terminal device 120 as shown in FIG. 1. Additionally or alternatively, the method 1100 can also be implemented at other terminal devices not shown in FIG. 1. For the purpose of discussion, the method 1100 will be described with reference to FIG. 1 as performed by the terminal device 120 without loss of generality.

At block 1110, the terminal device 120 receives, from the network device 110, first control information associated with first data to be transmitted from the network device 110 to the terminal device 120. At block 1120, the terminal device 120 receives, from the network device 110, second control information associated with second data to be transmitted from the network device 110 to the terminal device 120, the first control information and the second control information being transmitted by the network device 110 via a first TRP and a second TRP, respectively, a first starting time point of the first control information and a second starting time point of the second control information being within one time interval for the terminal device 120 to monitor control information from the network device 110.

At block 1130, the terminal device 120 selects target control information from the first control information and the second control information, based on a transmission criterion of the target control information use by the network device. At block 1140, the terminal device 120 transmits, to the network device 110, a first feedback for the first data and a second feedback for the second data on a feedback channel indicated in the target control information.

In some embodiments, selecting the target control information may comprise at least one of: selecting control information transmitted via a pre-defined TRP; selecting control information transmitted in a pre-defined CORESET; selecting control information transmitted using a CORESET with a lower index; selecting control information searched in a search space with a lower index; selecting control information transmitted in a PDCCH with a greater monitoring index; selecting control information transmitted in a PDCCH with a later end time point; and selecting control information transmitted in a PDCCH with a greater DAI.

Figure 12:
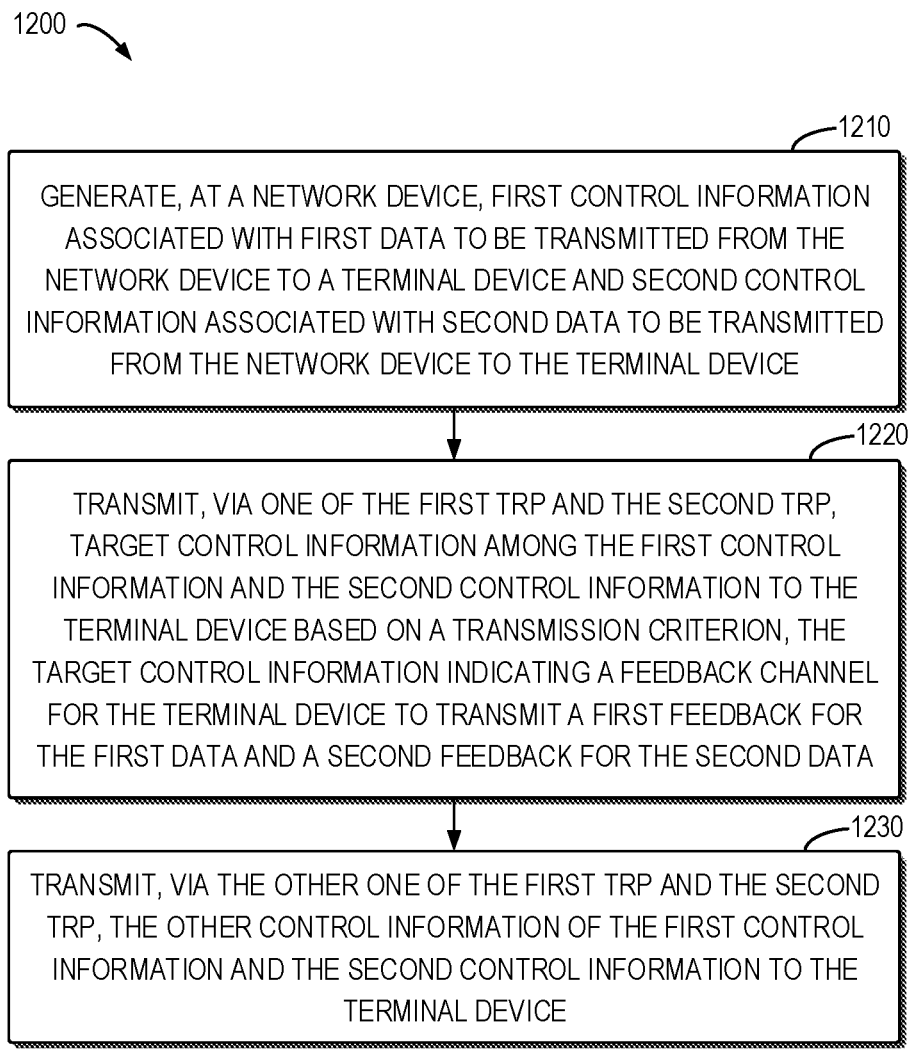
FIG. 12 shows a flowchart of another example method in accordance with some embodiments of the present disclosure.

FIG. 12 shows a flowchart of another example method 1200 in accordance with some embodiments of the present disclosure. In some embodiments, the method 1200 can be implemented at a network device, such as the network device 110 as shown in FIG. 1. Additionally or alternatively, the method 1200 can also be implemented at other network devices not shown in FIG. 1. For the purpose of discussion, the method 1200 will be described with reference to FIG. 1 as performed by the network device 110 without loss of generality.

At block 1210, the network device 110 generates first control information associated with first data to be transmitted from the network device 110 to the terminal device 120 and second control information associated with second data to be transmitted from the network device 110 to the terminal device 120, the first control information and the second control information being to be transmitted by the network device 110 via a first TRP and a second TRP, respectively, a first starting time point of the first control information and a second starting time point of the second control information being within one time interval for the terminal device 120 to monitor control information from the network device 110.

At block 1220, the network device 110 transmits, via one of the first TRP and the second TRP, target control information among the first control information and the second control information to the terminal device 120 based on a transmission criterion, the target control information indicating a feedback channel for the terminal device 120 to transmit a first feedback for the first data and a second feedback for the second data. At block 1230, the network device 110 transmits, via the other one of the first TRP and the second TRP, the other control information of the first control information and the second control information to the terminal device 120.

In some embodiments, the transmission criterion may comprise at least one of: transmitting the target control information via a pre-defined TRP; transmitting the target control information in a pre-defined CORESET; transmitting the target control information using a CORESET with a lower index; transmitting the target control information in a search space of the terminal device 120 with a lower index; transmitting the target control information in a PDCCH with a greater monitoring index; transmitting the target control information in a PDCCH with a later end time point; and transmitting the target control information in a PDCCH with a greater DAI.

Figure 13:
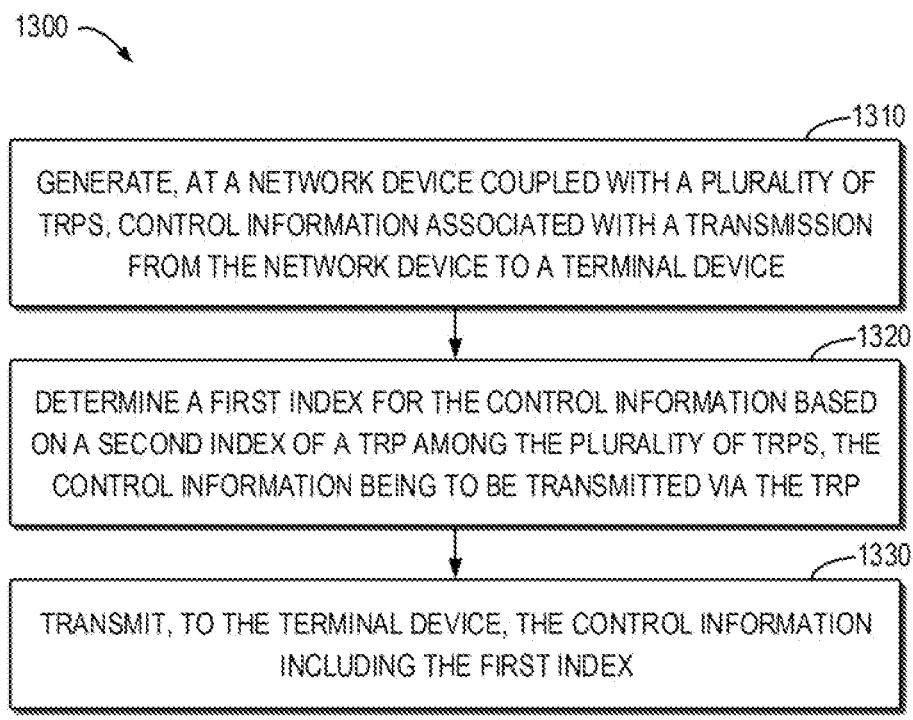
FIG. 13 shows a flowchart of another example method in accordance with some embodiments of the present disclosure.

FIG. 13 shows a flowchart of another example method 1300 in accordance with some embodiments of the present disclosure. In some embodiments, the method 1300 can be implemented at a network device, such as the network device 110 as shown in FIG. 1. Additionally or alternatively, the method 1300 can also be implemented at other network devices not shown in FIG. 1. For the purpose of discussion, the method 1300 will be described with reference to FIG. 1 as performed by the network device 110 without loss of generality.

At block 1310, the network device 110 coupled with a plurality of TRPs generates control information associated with a transmission from the network device 110 to the terminal device 120. At block 1320, the network device 110 determines a first index for the control information based on a second index of a TRP among the plurality of TRPs, the control information being to be transmitted via the TRP. At block 1330, the network device 110 transmits, to the terminal device 120 via the TRP, the control information including the first index.

Figure 14:
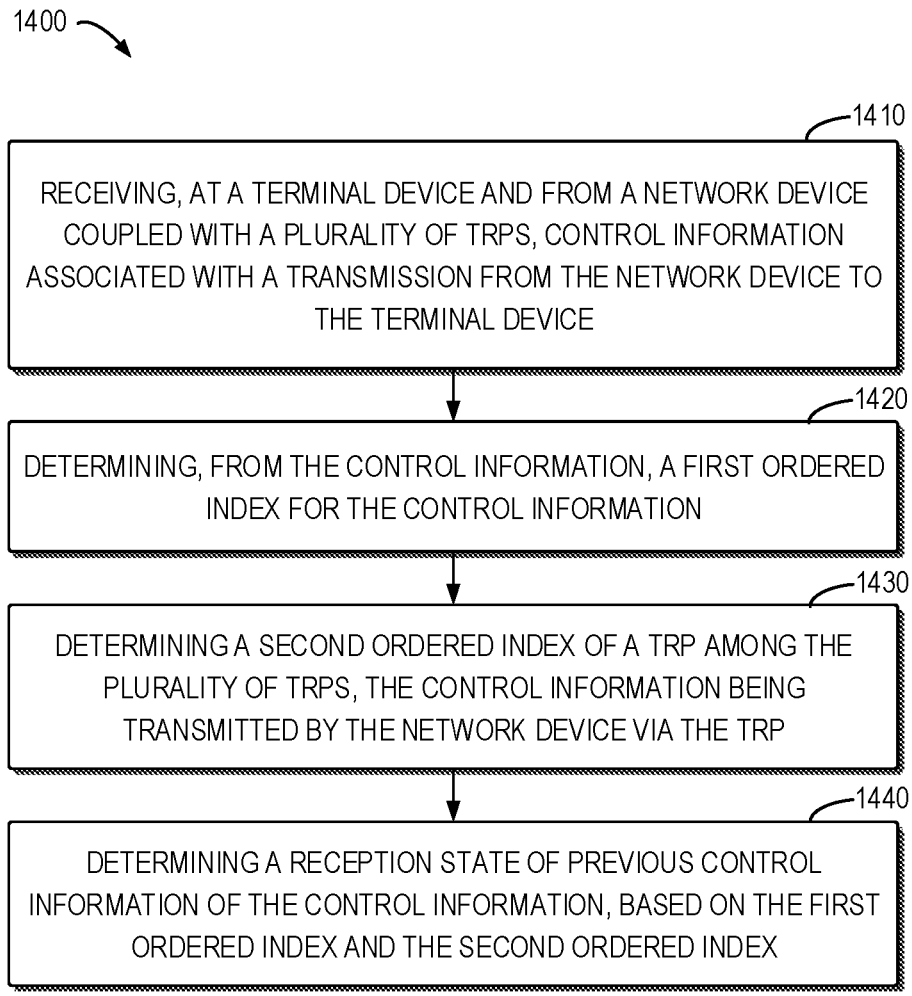
FIG. 14 shows a flowchart of another example method in accordance with some embodiments of the present disclosure.

FIG. 14 shows a flowchart of another example method 1400 in accordance with some embodiments of the present disclosure. In some embodiments, the method 1400 can be implemented at a terminal device, such as the terminal device 120 as shown in FIG. 1. Additionally or alternatively, the method 1400 can also be implemented at other terminal devices not shown in FIG. 1. For the purpose of discussion, the method 1400 will be described with reference to FIG. 1 as performed by the terminal device 120 without loss of generality.

At block 1410, the terminal device 120 receives, from the network device 110 coupled with a plurality of TRPs, control information associated with a transmission from the network device 110 to the terminal device 120. At block 1420, the terminal device 120 determines, from the control information, a first index for the control information. At block 1430, the terminal device 120 determines a second index of a TRP among the plurality of TRPs, the control information being transmitted by the network device 110 via the TRP. At block 1440, the terminal device 120 determines a reception state of previous control information of the control information, based on the first index and the second index.

Figure 15:
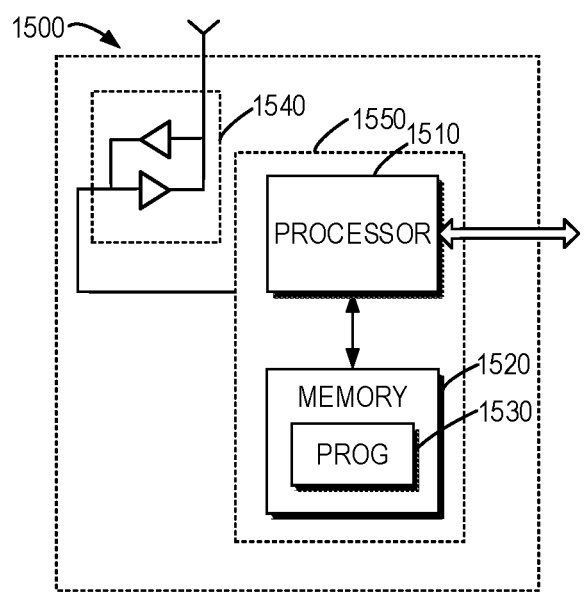
FIG. 15 is a simplified block diagram of a device that is suitable for implementing some embodiments of the present disclosure.

FIG. 15 is a simplified block diagram of a device 1500 that is suitable for implementing some embodiments of the present disclosure. The device 1500 can be considered as a further example embodiment of the network device 110 and the terminal device 120 as shown in FIG. 1. Accordingly, the device 1500 can be implemented at or as at least a part of the network device 110 and the terminal device 120.

As shown, the device 1500 includes a processor 1510, a memory 1520 coupled to the processor 1510, a suitable transmitter (TX) and receiver (RX) 1540 coupled to the processor 1510, and a communication interface coupled to the TX/RX 1540. The memory 1520 stores at least a part of a program 1530. The TX/RX 1540 is for bidirectional communications. The TX/RX 1540 has at least one antenna to facilitate communication, though in practice an Access Node mentioned in this application may have several ones. The communication interface may represent any interface that is necessary for communication with other network elements, such as X2 interface for bidirectional communications between gNBs or eNBs, S1 interface for communication between a Mobility Management Entity (MME)/Serving Gateway (S-GW) and the gNB or eNB, Un interface for communication between the gNB or eNB and a relay node (RN), or Uu interface for communication between the gNB or eNB and a terminal device.

The program 1530 is assumed to include program instructions that, when executed by the associated processor 1510, enable the device 1500 to operate in accordance with the embodiments of the present disclosure, as discussed herein with reference to any of FIGS. 6 and 9-14. The embodiments herein may be implemented by computer software executable by the processor 1510 of the device 1500, or by hardware, or by a combination of software and hardware. The processor 1510 may be configured to implement various embodiments of the present disclosure. Furthermore, a combination of the processor 1510 and memory 1520 may form processing means 1550 adapted to implement various embodiments of the present disclosure.

The memory 1520 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1520 is shown in the device 1500, there may be several physically distinct memory modules in the device 1500. The processor 1510 may be of any type suitable to the local technical network, and may include one or more of general purpose computers, special purpose computers, microprocessors, digital signal processors (DSPs) and processors based on multicore processor architecture, as non-limiting examples. The device 1500 may have multiple processors, such as an application specific integrated circuit chip that is slaved in time to a clock which synchronizes the main processor.

The components included in the apparatuses and/or devices of the present disclosure may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses and/or devices may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 6 and 9-14. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific embodiment details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a terminal device, comprising:
   receiving a higher layer configuration indicating one repetition scheme among a first frequency division multiplexing (FDM) scheme, a second FDM scheme and a time division multiplexing (TDM) scheme; and
   in response to being indicated with two transmission configuration indication (TCI) states and at least one DMRS port within one DMRS group:
     receiving a downlink transmission of a Transport Block (TB) in a case where the two TCI states are indicated and the first FDM scheme is indicated, wherein each of the two TCI states is associated with a non-overlapping frequency domain resource allocation;
     receiving two downlink transmissions of a same TB in a case where the two TCI states are indicated and the second FDM scheme is indicated, wherein each of the two TCI states is associated with a downlink transmission from the two downlink transmissions, and the downlink transmission is associated with a non-overlapping frequency domain resource allocation with respect to the other downlink transmission; or
     receiving two downlink transmissions of a same TB within a single slot in a case where the two TCI states are indicated and the TDM scheme is indicated, wherein each of the two TCI states is associated with a downlink transmission from the two downlink transmissions, and the downlink transmission is associated with a non-overlapping time domain resource allocation with respect to the other downlink transmission.

2. The method of claim 1, wherein in the case where the TDM scheme is indicated, a redundancy version for each downlink transmission is associated with a TCI state.

3. A method performed by a network device, comprising:
   transmitting a higher layer configuration indicating one repetition scheme among a first frequency division multiplexing (FDM) scheme, a second FDM scheme and a time division multiplexing (TDM) scheme; and
   in response to indicating to a terminal device, two transmission configuration indication (TCI) states and at least one DMRS port within one DMRS group:
     transmitting a downlink transmission of a Transport Block (TB) in a case where the TCI states are indicated and the first FDM scheme is indicated, wherein each of the two TCI states is associated with a non-overlapping frequency domain resource allocation;

transmitting two downlink transmissions of a same TB in a case where the TCI states are indicated and the second FDM scheme is indicated, wherein each of the two TCI states is associated with a downlink transmission from the two downlink transmissions, and the downlink transmission is associated with a non-overlapping frequency domain resource allocation with respect to the other downlink transmission; or transmitting two downlink transmissions of a same TB within a single slot in a case where the two TCI states are indicated and the TDM scheme is indicated, wherein each of the two TCI states is associated with a downlink transmission from the two downlink transmissions, and the downlink transmission is associated with a non-overlapping time domain resource allocation with respect to the other downlink transmission.

4. The method of claim 3, wherein in the case where the TDM scheme is indicated, a redundancy version for each downlink transmission is associated with a TCI state.

5. A terminal device comprising:
a receiver; and
a processor configured to:
receive a higher layer configuration indicating one repetition scheme among a first frequency division multiplexing (FDM) scheme, a second FDM scheme and a time division multiplexing (TDM) scheme; and in response to being indicated with two transmission configuration indication (TCI) states and at least one DMRS port within one DMRS group:
receive a downlink transmission of a Transport Block (TB) in a case where the two TCI states are indicated and the first FDM scheme is indicated, wherein each of the two TCI states is associated with a non-overlapping frequency domain resource allocation;
receive two downlink transmissions of a same TB in a case where the two TCI states are indicated and the second FDM scheme is indicated, wherein each of the two TCI states is associated with a downlink transmission from the two downlink transmissions, and the downlink transmission is associated with a non-overlapping frequency domain resource allocation with respect to the other downlink transmission; or
receive two downlink transmissions of a same TB within a single slot in a case where the two TCI states are indicated and the TDM scheme is indicated, wherein each of the two TCI states is associated with a downlink transmission from the two downlink transmissions, and the downlink transmission is associated with a non-overlapping time domain resource allocation with respect to the other downlink transmission.

6. The terminal device of claim 5, wherein in the case where the TDM scheme is indicated, a redundancy version for each downlink transmission is associated with a TCI state.

* * * * *